United States Patent [19]
Taylor et al.

[11] Patent Number: 6,153,859
[45] Date of Patent: Nov. 28, 2000

[54] LIQUID HEATING VESSELS

[75] Inventors: John Crawshaw Taylor, Castletown; Keith Barrie Doyle, Tetbury, both of United Kingdom

[73] Assignee: Strix Limited, United Kingdom

[21] Appl. No.: 09/011,109

[22] PCT Filed: Jul. 31, 1993

[86] PCT No.: PCT/GB96/01875

§ 371 Date: Aug. 10, 1998

§ 102(e) Date: Aug. 10, 1998

[87] PCT Pub. No.: WO97/04694

PCT Pub. Date: Feb. 13, 1997

[30] Foreign Application Priority Data

Jul. 31, 1995 [GB] United Kingdom .................... 9515662
Mar. 13, 1996 [GB] United Kingdom .................... 9605345

[51] Int. Cl.[7] ..................................... A47J 31/56
[52] U.S. Cl. ........................................ 219/441; 219/439
[58] Field of Search .................... 219/430, 438, 219/439, 441; 392/444, 497, 498; 99/281, 323.3

[56] References Cited

U.S. PATENT DOCUMENTS

| 3,513,292 | 5/1970 | Sano et al. ............................. 392/447 |
|---|---|---|
| 5,635,092 | 6/1997 | O'Neill ................................... 219/441 |
| 5,793,020 | 8/1998 | O'Neill ................................... 219/441 |
| 5,897,805 | 4/1999 | McClean ................................. 219/441 |

FOREIGN PATENT DOCUMENTS 0 464 100 B1   9/1993   European Pat. Off. .

Primary Examiner—Joseph Pelham
Attorney, Agent, or Firm—Testa, Hurwitz & Thibeault, LLP

[57] ABSTRACT

A liquid heating vessel (6) has a heated base (8) and a thermally sensitive control mounted to the base (8). The control comprises a boiling control for interrupting the supply of energy to the vessel element (12) when liquid in the vessel boils. It is responsive to the liquid temperature in a sump (18) in the vessel base, and comprises a bimetallic actuator (100) in thermal contact with the sump (18) through a C-shaped copper conductor member (110). The vessel also comprises a simmer control operable to maintain the liquid in the vessel at a predetermined temperature after boiling. This control comprises a snap-acting bimetallic actuator through which the current to the element flows to rapidly heat the actuator after a set of contacts is closed, so as to supply energy to the element in short bursts to prevent an audible heating sound.

11 Claims, 18 Drawing Sheets

LIQUID HEATING VESSELS

CROSS-REFERENCE TO RELATED APPLICATIONS

This application claims priority to and the benefit of international application serial number PCT/GB69/01875, filed Jul. 31, 1996, which claims priority to and the benefit of British application serial number 9515662.6, filed Jul. 31, 1995, and British application serial number 9605345.9, filed Mar. 13, 1996.

The present invention relates to liquid heating vessels, and in particular, but not exclusively, to water heating vessels which may be used to boil water and then maintain the water at a predetermined temperature.

Such vessels are particularly popular in the Far East (where they are called "airpots") where water supplies may not be entirely clean or may be highly chlorinated and where it is therefore desirable to boil the water for a prolonged period (typically 1 to 3 minutes) to sterilise or de-odorise the water. After boiling, the water is kept at a relatively high temperature, usually around 92° C. There is also the requirement that the water in the vessel may be reboiled, for example if it has been standing for some time, or if fresh water is added to the vessel. The vessels are usually sealed and have a lid mounted pump to dispense water from the vessel without the need to open it.

Airpots have two independently controlled heating elements, one for boiling the water and rated, typically, at around 630 W and the other for keeping the boiled water warm, and rated, typically, at about 70W. These elements are independently controlled and are usually formed as belts wrapped around and secured to a lower part of the vessel wall. The element for keeping the water warm may be controlled typically by a thermostat, or electronically. The boiling heating element is sometimes controlled by a bimetallic actuator arranged in the pump or lid of the vessel, the steam path to the actuator and the thermal capacity of the surrounding mechanism introducing a lag from the time water boils in the vessel to the element being switched off. Alternatively the boiling element may be controlled electronically. However, both these arrangements are expensive.

In a first aspect, the present invention seeks to provide an alternative boiling control in a vessel as described above which does not require the sensing of temperature of steam and which will allow a desired boiling time to be achieved, and preferably, at the same time, allow for re-boiling of the water, and which may be reset quickly after its operation in order to allow water in the vessel to be re-boiled relatively soon after boiling, if required.

From a first aspect, therefore, the invention provides a liquid heating vessel having a heating element and base, the base having a sump with a relatively small volume compared to the volume of the vessel as a whole, for containing a relatively small volume of liquid, thermally-responsive means arranged thermally remote from said sump, for interrupting a flow path of electrical energy to the element upon reaching a predetermined temperature, and thermal conduction means arranged between said sump and said thermally responsive means for conducting heat from the sump to the thermally responsive means.

Thus in accordance with the invention, a relatively small volume sump is provided in the base of the heating vessel. This will contain a relatively small volume of liquid which, during heating of the liquid in the vessel will remain relatively isolated from the remaining liquid in the vessel and whose temperature will therefore lag behind that of the main body of liquid. However as heating progresses, convection increases, and as the liquid approaches boiling the liquid in the vessel will become extremely agitated and turbulent, thereby causing the volume of liquid in the sump to be displaced by, or mix with, the main body of liquid. The temperature of the liquid in the sump will then rise rapidly to that of the main body of liquid, so that boiling of the liquid in the vessel can be sensed by the sudden temperature rise of the sump. However in order to provide a desired period of boiling, the thermally responsive means are arranged thermally remote from the sump, with thermal conduction means being arranged to conduct heat from the sump to the thermally responsive means.

The boiling period achievable will depend on a number of factors, and primarily the thermal conductivity of the conduction means, the length of the thermal path, the thermal capacity of the system and the operating temperature of the thermally responsive means, and these factors can be chosen to give a desired boiling period.

It will also be apparent that once the thermally responsive means has operated to interrupt a power flow path to the element of the vessel, and the power supply to the element is interrupted, the thermal conduction means will still act to conduct heat away from the sump region and dissipate it, primarily through convection. Once the liquid in the vessel settles after boiling, the liquid in the sump will once more become isolated from the main liquid body, and as such will be cooled more quickly than the rest of the liquid. Accordingly the temperature of the sump will drop relatively quickly, to allow the thermally responsive means to fall below a temperature at which it may reset automatically or be reset manually so as to reconnect the power supply to the element. Thus the resetting of the boiling control may be accelerated since resetting will depend only on the relatively rapid fall in temperature of a relatively small volume of liquid rather than the temperature of the total liquid volume in the vessel.

This in itself is a novel arrangement which may be applicable to types of water heating vessels other than those described above, for example in kettles or in hot water jugs and where a prolonged boiling time may not be required, and from a second broad aspect therefore, the invention provides a liquid heating vessel having a heating element and base, the base having a sump region having a relatively small volume compared to the volume of the vessel for containing a relatively small volume of liquid, thermally-responsive means responsive to the temperature of liquid in said sump and interrupting a flow path of electrical power to the element at a predetermined temperature, and thermal conduction means in thermal contact with said sump for conducting heat away from said sump so as to cool the sump once the power to said element has been interrupted.

The thermal conduction means may be configured to cool the sump at a desired rate. For example it may be a disc which will allow a large degree of convective cooling to take place. Preferably the thermal conduction means comprises a member of copper or other high thermal conductivity material.

In a preferred embodiment, particularly for arrangements where prolonged boiling is required the thermal conduction means comprises a strip of copper or other high thermal conductivity material which is arranged in thermal contact with the sump, most preferably the base of the sump, and which is in thermal contact with the thermally responsive means at a location remote from the sump. The boiling period can be varied for particular applications by thermally contacting the thermally responsive means with the strip at locations nearer to or further away from the sump.

Preferably the thermally responsive means comprises a bimetallic or similar actuator such as memory metal which acts to open a set of electrical contacts, for example those of a microswitch upon reaching a predetermined temperature. The term "bimetallic actuator" as used herein is intended to cover all such actuators.

Preferably the thermally responsive means is configured to reset automatically once its temperature falls below a predetermined reset temperature. This will allow the liquid in the vessel to be reboiled automatically if, for example, fresh cold water is added to the vessel or if the vessel is switched off overnight, the liquid then cooling, so that when the vessel is switched on once more, power is automatically supplied to the element without the need to reset the system manually.

Most preferably the thermally responsive means is further arranged so as to be resettable manually once it cools to below its "break" temperature. An example of such means would be a snap-acting, bistable microswitch actuated by a bimetallic actuator, and which may be manually reset within in its "hysteresis". Once the bimetallic actuator reaches a predetermined "break" temperature, its deflection is sufficient to snap the microswitch from its stable 'closed' condition to its stable 'open' condition. Once the bimetallic actuator cools to below the break temperature, the microswitch may be reset manually, i.e. by a user applying a force to the microswitch, to move from its open to its closed condition. If no manual reset is made, the bimetallic actuator will continue to cool and eventually reach its reset temperature at which it has deflected sufficiently to cause the microswitch to reset automatically.

Preferably the vessel has means for varying the liquid boiling time. In the arrangements described above, such means may comprise means for varying the set point of the microswitch whereby a greater or smaller deflection (and therefore temperature rise) of the bimetallic actuator is required to break the switch contacts.

As mentioned above, it is also required in airpots to maintain water at a predetermined temperature (e.g. at around 92° C.) after it has boiled. Preferably, therefore the vessel also has a simmer control means operable to maintain the liquid in the vessel at a predetermined temperature after boiling. Presently this is achieved using a separate, low wattage heater which is, typically controlled electronically. However, the provision of a separate heater with a separate control, is expensive, and the present invention, from a particular aspect proposes to use a single heating element both to boil liquid in a vessel and thereafter keep it at or around a predetermined lower value. From a further aspect, therefore the invention provides a liquid heating vessel comprising a heating element, a boiling control operable in the event of liquid in the vessel boiling to open a first set of switch contacts in the supply of electrical energy to the element and reset automatically below a predetermined temperature to close the contacts, and a simmer control operable to open and close a second set of switch contacts so as to maintain the liquid in the vessel at a predetermined temperature at or below boiling, said boiling and simmer controls being arranged electrically in parallel, the arrangement being such that during simmering, the boiling control does not fall below its reset temperature.

As stated above, the boiling control may also be such as to permit manual resetting after it cools to below its operating temperature, so that if necessary, liquid in the vessel may be reboiled during simmering.

It is also desirable to arrange the simmer control such that during simmering, the vessel is substantially silent, so as to avoid disturbing users of the vessel. Whilst this may not be a problem with existing airpots where the separate simmer element is of relatively low power, it could very well be where, in accordance with the aspect of the invention described above a single relatively high powered element is provided both to boil and thereafter to simmer the liquid. Preferably, therefore, the simmer control is arranged so as to supply energy to the element in sufficiently short bursts so that substantially no audible heating sound is produced.

From a further broad aspect, therefore the invention provides a liquid heating vessel comprising a heating element for bringing liquid in the vessel to a boil and thereafter for maintaining the liquid at or around a predetermined temperature, comprising simmer control means for supplying energy to said element after it has boiled to maintain such temperature in sufficiently short bursts so as to produce substantially no audible heating sound.

The maximum length of energy burst which can be supplied so as not to produce a heating sound can be determined empirically but, for example, a time of less than 6 seconds may be typical.

The likelihood of sound being generated is reduced if heat is applied or diffused over a relatively large area of the vessel base, for example if a thermal diffusion plate of aluminium or the like mounting a conventional sheathed heating element is provided on the base. The thermal diffusion will obviate local heat concentrations and thus local boiling, for example which may generate noise.

The simmer control should thus be able to supply energy in short bursts whenever the temperature of the liquid in the vessel falls below a desired value. Whilst that temperature may be easily sensed in a number of conventional ways in order to commence the simmer heating cycle, it will be appreciated that since energy is only to be supplied in short bursts, the temperature of the liquid will rise only very slightly during the heating time or not at all if there is a sufficiently large thermal lag between the element and the vessel, for example as may be the case say when using a conventional sheathed heating element, which has a relatively high thermal capacity, which is mounted on a thermal diffusion plate under the vessel base. Accordingly, the simmer control preferably acts to interrupt the power supply to the heating element in response to means representative of the amount of energy supplied to the element rather than to the liquid temperature.

In the preferred embodiment, the simmer control comprises a bimetallic actuator responsive to the temperature of the liquid in the vessel such that when that temperature falls below a desired temperature, it acts to close a set of switch contacts to allow energy to be supplied to the element, and means for rapidly heating said actuator to a temperature at which it acts to open the contacts when said contacts are closed.

The actuator need not directly sense the temperature of the liquid in the vessel, but may be in thermal contact with it. For example, the actuator may sense the ambient temperature below the vessel base which will be representative of the liquid temperature. The temperature of the actuator corresponding to a desired liquid temperature can be determined empirically. This will also take into account the thermal capacity of the base region and so on.

Several ways of rapidly heating the actuator may be envisaged. For example, the actuator may be mounted in thermal contact with the element itself, so as to be heated by the element directly. Alternatively, the actuator may be provided with an 'accelerator' heater such as a substrate heater which is supplied with energy only while the element is supplied. Preferably, however, the actuator is resistively heated by the element current itself passing through the actuator itself. The heating cycle time will then be determined by the heating current, the actuator material and its operating temperature. Preferably the actuator is a snap acting bimetallic actuator for example of the type described in GB-A-657434. Such actuators are dished and reverse their curvature upon reaching a predetermined upper temperature, and return to their original curvature when falling below a predetermined lower, reset, temperature.

Thus the preferred simmer control comprises a bimetallic actuator which acts to close a set of electrical contacts to supply energy to the heating element of the vessel when the temperature of the liquid in the vessel falls below a predetermined value, that energy flowing through the actuator to heat it to a break temperature at which the actuator acts to open the contacts once more.

Whilst it would be possible to provide the boiling control and simmer controls as completely independent units, preferably they are amalgamated into an integrated assembly. From a further aspect therefore, the invention provides a combined boiling and simmer control unit in or for a liquid heating vessel, said unit comprising terminals to allow the unit to be connected in the electrical supply to a heating element of the vessel, a first set of switch contacts arranged between said terminals, a first bimetallic actuator responsive to liquid in said vessel boiling to open said set of contacts, a second set of switch contacts arranged between said terminals, and electrically in parallel with said first set of switch contacts, and a second bimetallic actuator operable to close said second set of contacts in response to the temperature of the liquid in the vessel falling below a predetermined value after the liquid has boiled and to open said second set of contacts after it temperature rises to a predetermined break temperature.

The respective actuators may comprise bimetallic actuators as described above. Thus in a particularly preferred embodiment, the first actuator may comprise a bimetallic actuator acting upon a microswitch, and the second actuator may comprise a bimetallic actuator connected in series with the second set of switch contacts so as to be heated by the current flowing through the switch contacts when they are closed.

Most preferably, the fixed contact of each pair of switch contacts is mounted on a common contact plate which, most preferably also provides or mounts one of the terminals of the unit.

Preferably the components of the unit are stacked one upon the other so to provide a particularly compact arrangement. Most preferably the components are assembled on an insulating spigot with insulating spacers between conductive parts. The spigot may be provided on a plastics moulding which, for example, may also act to mount means for adjusting the operating points of the actuators and also possibly an electrical connector for the vessel.

The above embodiment suggest a single heating element being used both to heat the liquid in the vessel to boiling and to maintain it at a desired temperature thereafter. However, the invention is not limited to such arrangements. Accordingly the invention can be applied to arrangements in which a lower wattage simmer element keeps the liquid at the desired temperature after it has boiled.

Preferably, in such arrangements, the boiling control may have the features described above and, as described above, the respective boiling and simmer controls are arranged in parallel and such that during simmering the boiling control does not reset.

The wattage and watts density of the simmer element is chosen to be much lower than where a single element is used. For example, the wattage of the simmer element may be in the region of 50 W compared to say 700 W for the full heating element. It is still preferred to cause the simmer control to switch off in response to a parameter other than water temperature. In the earlier embodiment, it was suggested that the 'break' temperature of the simmer control be sensed from the heater per se or from the heat generated by the current flowing through an actuator in the control. In an arrangement where a separate simmer element is used, however, the current flowing through any actuator would be insufficient to generate a substantial heating effect in the actuator. Accordingly, therefore, the 'break' temperature of the simmer control is preferably sensed from the element temperature itself. An actuator may, therefore, be arranged in thermal contact with a portion of the simmer element so as to be heated thereby. If required, a suitable thermal offset can be introduced between the element and the actuator, for example by introducing a thermal path such as a thermally conductive member between the element and the simmer actuator. As in the earlier embodiment, when the simmer element is switched off by the simmer control, the actuator will sense water temperature via the conduction path and this temperature will determine when the simmer control resets.

The simmer actuator may be a creep bimetallic actuator which operates a microswitch, or a snap-acting bimetallic actuator. Preferably, however, the actuator is a creep bimetallic actuator operating a microswitch, as this may easily allow for a variable simmer temperature to be set by changing the set point of the microswitch. In a particularly preferred embodiment therefore, both the simmer control and the boiling control are adjustable.

The respective boiling and simmer controls may be formed as stacks of components, as in the boiling control in the earlier embodiment. The controls may be connected by a common electrical terminal, so as to form an integrated boiling and simmer switch unit which can be assembled into a moulding. This is a novel arrangement in itself and from a further aspect, the invention provides a combined boiling and simmer switch unit in or for a liquid heating vessel comprising respective boiling and simmer switches connected together by a common link, each of said switches comprising a bimetallic actuator operating a snap-acting microswitch.

As described above, the components of each switch are preferably arranged in a stack, the link joining the respective stacks. The link may form a common contact member for both switches.

The respective switches can be arranged in any desired orientation to one another, but preferably they are arranged in a generally U-shape, with the common link forming the cross-limb of the U. This will allow the unit to be placed around the vessel sump and so permit a compact arrangement.

These are also believed to be novel arrangements per se, and from a yet further broad aspect, therefore, the invention provides a control unit for assembly to a liquid heating vessel comprising a plastics moulding, said moulding mounting a boiling control for the vessel, a simmer control for the vessel and also means for adjusting the boiling and/or simmer control and/or an electrical connector for connection to an external power supply.

The electrical connection to the control unit can be a standard inlet pin arrangement, for example, to be engaged by a socket on a power lead for the vessel. Preferably, however, the connection is a so-called cordless connector, for engagement with a corresponding connector part on a base for the vessel. Most preferably, the connector is arranged generally centrally of the base of the vessel and is of the type which will allow electrical connection to be made irrespective of the relative rotational orientation of the vessel and base. Such a connector is shown in WO 95/08204. Preferably the electrical parts of the connector are mounted with a suitably moulded portion of the control unit to provide an integrated control and connector unit.

As was mentioned above, it is preferable to mount the connector generally centrally of the base of the vessel. However, if a sump is provided centrally in the vessel base, this may interfere with the positioning of the connector leading, possibly, to a very deep control, which is not desirable for stability reasons. Preferably, therefore, the sump is offset from the axis of the vessel, with the connector being laterally offset from the sump. This is itself a novel arrangement, and from a further aspect the invention provides a liquid heating vessel comprising a heater plate mounted in the base of the vessel, said heater plate having a sump offset from the axis of the vessel, and further comprising a cordless electrical connector arranged under the vessel base generally aligned with the axis of the vessel.

Preferably the sump is arranged centrally of the heater plate and the heater plate itself offset from the axis of the vessel.

The means for adjusting the boiling and/or simmer controls, in the preferred arrangements described above comprise means for changing the set points of the simmer and/or boiling microswitch. Preferably such means comprises a cam member most preferably a rotary cam operatively coupled to the microswitch such that a greater or lesser movement of the bimetallic actuator is required to cause the switch to operate. Most preferably the cam member is movable between say two positions, say a "1 minute" boil or a "5 minute" boil of a 85° C. or 95° C. simmer position. The cam may be moved with a snap-action between the two positions, for example by an over-centre spring mechanism. Most preferably the movement is caused by a push button rocker-type arrangement, respective push buttons being provided on opposed links, of a generally T-shaped pivotally mounted rocker arm which is coupled to the cam. The rocker arm is preferably spring biased into each position. The buttons are preferably guided to move linearly, and are pivotally joined to the rocker arm. Such a switch actuator is in itself believed to be novel, and from a yet further aspect, there is provided a switch actuator comprising a pivotally mounted generally T-shaped rocker arm, buttons pivotably mounted on the opposed outer ends of said arm and guided so as to move generally linearly, and spring means to move the arm between respective pivotal positions with a snap action when respective buttons are pressed.

The rocker arm is then suitably coupled to the control cam of the boiling and or simmer switch(es)

If both the boiling and simmer switches are adjustable, the respective actuators may be arranged generally on top of one another.

In the preferred embodiment, the setting of the respective switches may be indicated visually by illuminating the buttons. Preferably, therefore, the buttons are light transmitting and illuminated by a suitable means. Most preferably the buttons are illuminated by a single light source, such as a neon indicator, which is mounted in a housing with windows arranged opposite light receiving portions of the buttons. When the light receiving portions of the buttons are arranged opposite the window, light will be transmitted through the button to a user. This is believed to be a novel arrangement in itself, and from a yet further aspect, therefore the invention provides a switch comprising a light source, and a plurality of operating buttons for switching the switch between desired positions, said buttons being light transmitting and having light receiving portions arranged to be movable to selected positions so as to receive light from said source so as to illuminate the button.

In addition to the above, the moulding may also mount components of an overheat protector for the vessel, which is operable in the event of the vessel overheating to interrupt the power supply to the element.

From yet a further broad aspect, therefore, the invention provides an integrated control unit for mounting to a liquid heating vessel, said unit comprising a boiling control for the vessel, a simmer control operable to maintain the liquid in the vessel at a predetermined temperature after boiling, and an overheat protector control operable in the event of the element overheating to interrupt the power supply to the element.

The respective switch components of these controls may all be provided in a moulding which may be mounted to the vessel base.

The moulding may itself be mounted directly to the vessel base or to a mounting plate mounted to the base of the vessel and having a pair of spaced apart bimetallic actuators mounted thereon and operable respectively in the event of the element overheating to open the set of overheat switch contacts in the electrical supply to the element. In such a case, the moulding effectively indirectly mounts the overheat actuators. Such an arrangement is described in broad terms in WO 95/34187.

Alternatively one or more actuators may be mounted directly on the moulding for engagement with the vessel base.

Preferably, the overheat electrical contacts are provided in the line and neutral sides of the electrical supply to the element. More preferably still, a contact of one of said sets of electrical contacts forms part of the combined boiling/simmer control unit, described above, most preferably being provided on the common contact plate thereof.

In the preferred embodiment, the heater is formed on a plate which is mounted in the base of, in particular, a plastics vessel, for example by the mechanism described in WO 90/18331. In this case, mounting means are preferably provided on the vessel around the heater to receive the control unit.

This in itself is believed to be a novel arrangement, and from a further aspect, the invention provides a liquid heating vessel comprising a heater provided on a plate mounted in the vessel base, the vessel having means arranged around the plate to mount a control unit for the heater.

The control may be mounted to the base of the vessel together with a base cover part for the vessel. In this way, the control and base cover may be secured to the vessel at the same time. This is in itself a novel arrangement, and from a further aspect, the invention provides a liquid heating vessel, a control therefor, arranged under the base of the vessel, and a base part for the vessel, said base part and said control being secured to the vessel base by common means.

The base part could, for example be a base plate extending across the bottom of the vessel to prevent access to the control, of, it could be, for example, a ring adapted to form a lower external part of the vessel.

In the dual element arrangement described above, in which two elements are provided, one of which acts to keep the liquid at a desired temperature after it has boiled, it would, for example, be possible to provide say two heating belts in a known manner.

Preferably, however, the main element and simmer element comprise so-called thick film heating elements of the type comprising a resistive heating track laid down on an insulating substrate. Such an arrangement is believed to be novel in its own right, and from a yet further aspect, the invention provides a liquid heating vessel having a first element substantially for heating liquid in the vessel for boiling and a second element substantially for maintaining liquid in the vessel at a predetermined temperature thereafter, wherein said first and second elements are thick film heating elements.

Separate track parts having respective terminals at both ends may be provided, but preferably, a single track is provided with terminals at end portions thereof, with an intermediate terminal which divides the element effectively into a main heating portion and a simmer heating portion.

The main heating portion may have a relatively low resistance, so as to produce a relatively high heating effect, whilst the simmer portion may have a relatively high resistance to produce a relatively low heating effect.

Typically therefore the main heating element may be rated at say 700 W and the simmer heating element at about SOW. The watts density of the main element may be rather high, for example around 50–60 $Wcm^{-2}$, but that of the simmer element should be chosen to be low, so as to avoid audible heating sounds. A typical value could be around 5–6 $Wcm^2$.

The element may be arranged such that in the 'simmer' mode, both the main heating portion and the simmer portion of the track are energised. However, in view of the total resistance of the track, the heating effect generated in the main portion will be relatively small compared to the heating effect of the simmer portion. This is also believed to be novel, so from a yet further broad aspect, therefore the invention provides a water heating vessel for heating a liquid to boiling and thereafter maintaining it at a desired lower temperature comprising a relatively high resistance heating element and a relatively low resistance heating element arranged in series, and control means for supplying energy to just the low resistance element to heat the liquid to boiling and to both elements when it is desired to thereafter maintain the liquid at said desired lower temperature.

In one preferred arrangement, the main heating element may be arranged generally centrally of the base of the vessel around the base sump, with the simmer element arranged around the periphery thereof.

The actuator of the simmer control may be placed in thermal contact with the simmer element. For example a strip of thermally conductive material such as copper may be arranged to lie over a portion of the simmer element.

When using so called thick film heaters, electrical connections may be made to the track in any suitable manner. Preferably, however, contact is made by resilient contact means being urged against a terminal portion of the track. Most preferably, a resilient conductive blade is urged against the track. Preferably the free end of the blade is bent over so that the end of the blade makes a line contact with the terminal portion of the track.

Preferably the contact is urged against the track as the control is mounted to the vessel. This may be effected simply by allowing the contact to project from the control to engage the track as the control is mounted thereto. In a particularly preferred arrangement, however, the contact is urged into with the track by a pivot arrangement in which a pivot member remote from the contact engages the heater and pivots the contact about a fulcrum on the control into resilient engagement with the track. This is an advantageous arrangement in that it allows a greater contact force to be generated at the track than would be possible, for example with a cantilever-mounted contact blade.

This is itself a novel arrangement, and from a yet further aspect, the invention provides a contact assembly for a thick film heater comprising a contact member having a contact portion for engaging a terminal portion of the track, a pivot member arranged remote from the end portion and extending for engagement with a portion of said heater, and a fulcrum arranged between said pivot member and said contact portion, the arrangement being such that as said assembly is mounted to said heater, the pivot member engages the heater and acts to pivot said contact portion of said contact member about said fulcrum into contact with a terminal of said heater track.

In this way the contact will be urged into contact, with the terminal of the track as the assembly is mounted to the heater.

The contact member is, as described above, preferably resilient, and most preferably comprises a leaf spring having one end folded over so as to produce a line contact with the track. Of course other arrangements are possible, for example a separate contact member could be provided on the leaf spring.

In such arrangements, as the contact is pivoted into engagement with the heater terminal the contact member effectively becomes spring loaded, so as resiliently to urge its contact portion into arm contact with the terminal.

Preferably the pivot member comprises a push rod or the like and is suitably coupled to, for example mounted on the contact member. In a particularly preferred arrangement, the pivot member is guided so as to move in a generally linear fashion, for example in guides in a control housing.

Most preferably, the pivot member is thermally deformable such that in the event that the heater overheats, it will deform under the resilience of the contact member, so allowing the contact to pivot away from the track terminal, thereby disconnecting the electrical supply to the track. Thus the pivot member acts effectively as a thermal fuse, which may operate in the event that the heater seriously overheats. One or more of the contacts to the main and/or simmer element may be provided with a thermal fuse as described above.

In existing airpot designs, an inner, liquid containing container is surrounded by a radially outer casing. The base of the vessel is normally provided with a number of mounted brackets which are welded to the base for receiving mounting screws or other fasteners for the casing. This, however, is expensive and cumbersome, and in accordance with a further aspect of the invention this construction is simplified. In accordance with this aspect of the invention, there is provided a liquid heating vessel comprising an inner, liquid containing portion, and a radially spaced casing, said casing being mounted, directly or indirectly, to a mounting member for a thermally sensitive control which is itself mounted to the vessel base or to the control itself.

With such an arrangement the mounting plate, as described above or the plastics moulding itself may have locations to receive fastening means for the casing, which may be clamped in position.

Preferably the inner container has a peripheral flange at its upper end to receive and locate the upper edge of the casing, for example with a sealing ring interposed between them.

Also in existing airpot designs, both the inner, liquid containing vessel and the outer casing are normally metallic, typically of a rolled sheet construction. Such constructions are expensive to produce and, for example, means that designs tend to have little aesthetic appeal. Furthermore, there is very little thermal insulation of the vessel which means that energy may be wasted.

From a further aspect the invention provides a liquid heating vessel comprising an inner, liquid containing portion and a casing arranged around said inner portion at a radial spacing therefrom, said inner and outer portions being made of plastics.

Thus in accordance with this aspect of the invention, an insulating space is formed between inner and outer plastics portions, giving improved insulation.

Preferably the inner and outer portions are integrally moulded as a single component to reduce production costs.

Preferably the outer portion is stiffened by ribs extending between the inner and outer casing.

Further, preferably, the inner vessel has an aperture in the base thereof which is closed by a heating device for the vessel. For example, the base may be formed as a heated plate mounted in the base.

To facilitate discharge of liquid from the inner vessel, the base of the vessel may be provided with an outlet for connection to a discharge pipe connected to an outlet to the vessel. When the interior of the inner vessel is pressurised using known means, then liquid may be discharged through the base of the vessel into the discharge pipe. The discharge pipe may be integrally moulded with the casing.

Preferably the outer portion has a slot running from top to bottom to allow a sight guuage to be inserted.

A preferred embodiment of the invention will now be described, by way of example only, with reference to the accompanying drawings, in which.

Figure 1:
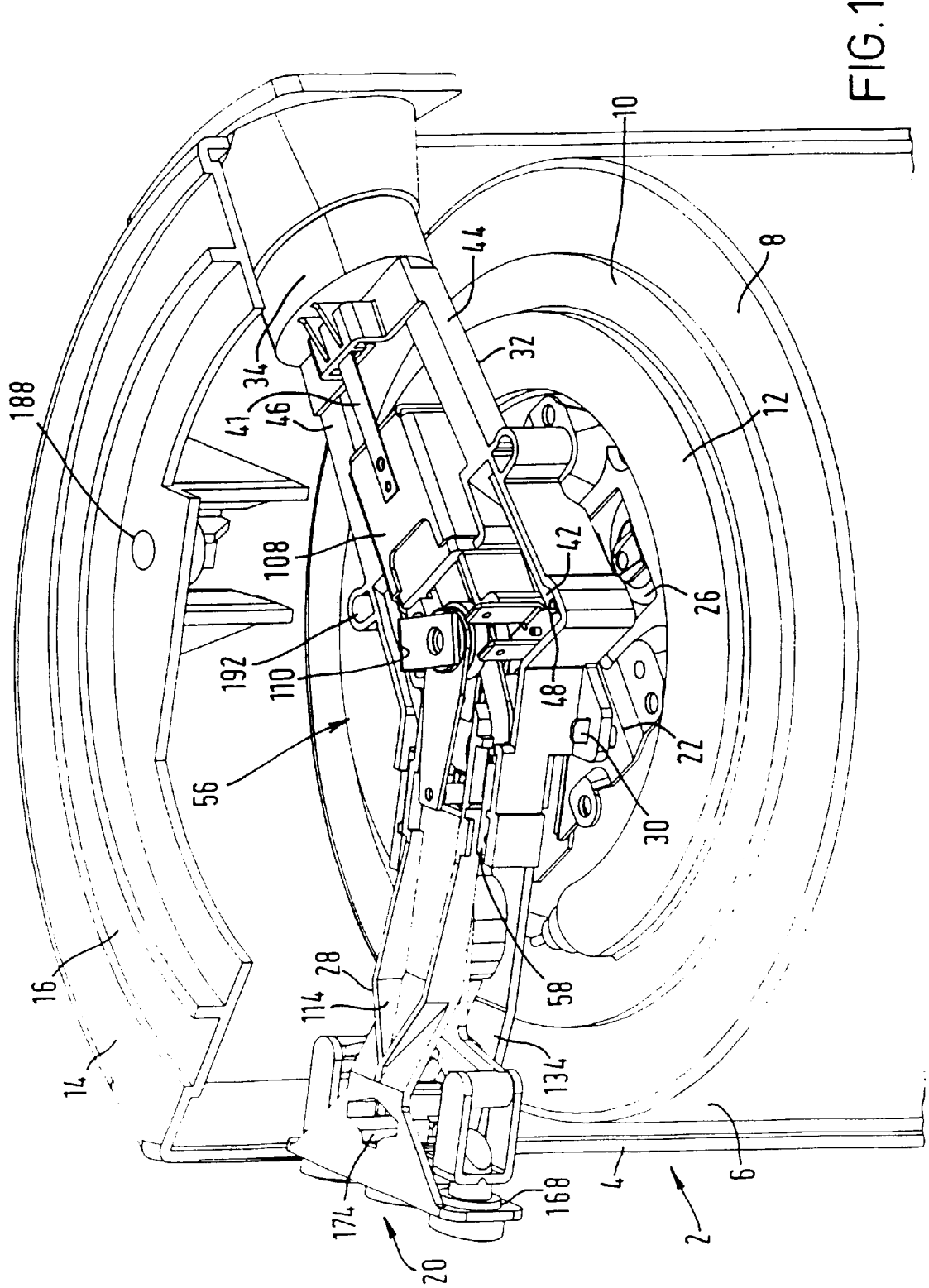
FIG. 1 shows a perspective view of an embodiment of the invention.
Figure 2:
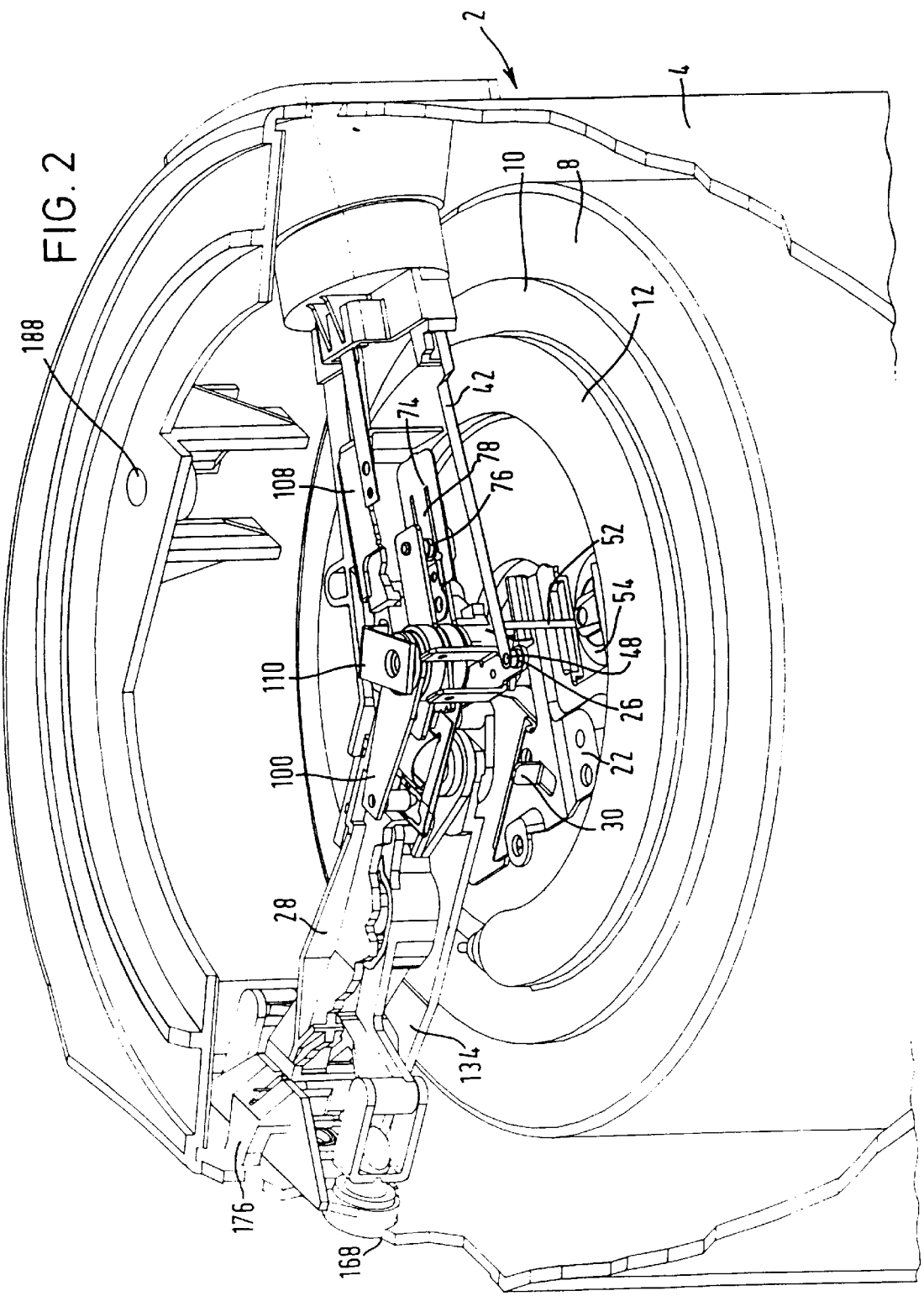
FIG. 2 shows a further perspective view, but with certain components cut away for purposes of clarity.
Figure 3:
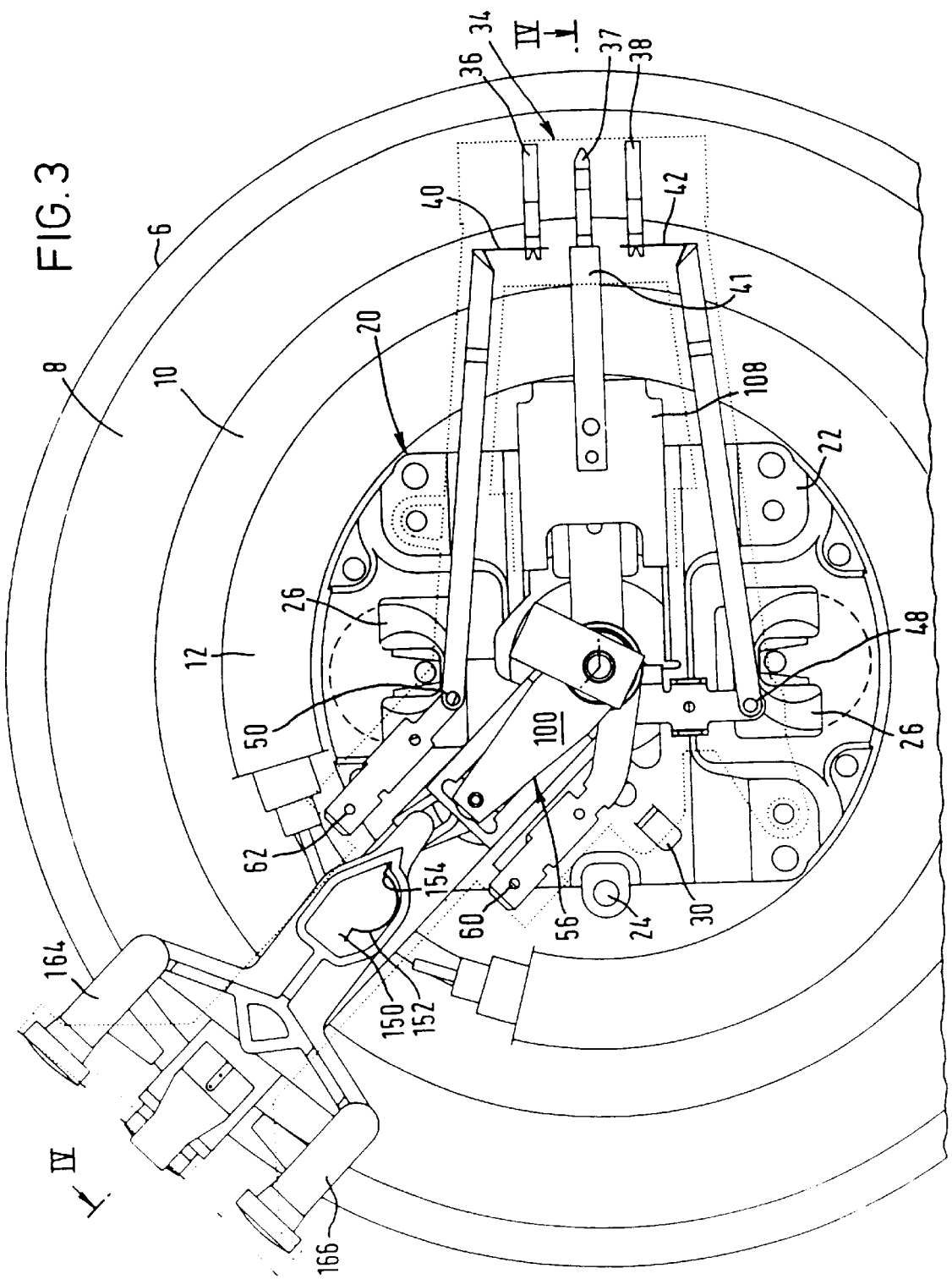
FIG. 3 shows a plan view of the embodiment of FIGS. 1 and 2 again with certain components removed for clarity.

With reference to FIGS. 1 to 4, an airpot 2 (shown in an inverted configuration) comprises an outer casing 4 and an inner liquid containing vessel 6. The liquid containing vessel 6 is made from stainless steel and on its base 8 there is provided an annular thermal diffusion plate 8 of aluminium or aluminium alloy on which is mounted a conventional sheathed heating element 12 rated at, for example about 700 W, which is intended to be used, for example, with a 100V supply. A partially open cover 14 is provided over the bottom of the vessel and is provided with a groove 16 for receiving bearings so that the vessel may be placed on a rotating base.

Figure 4:
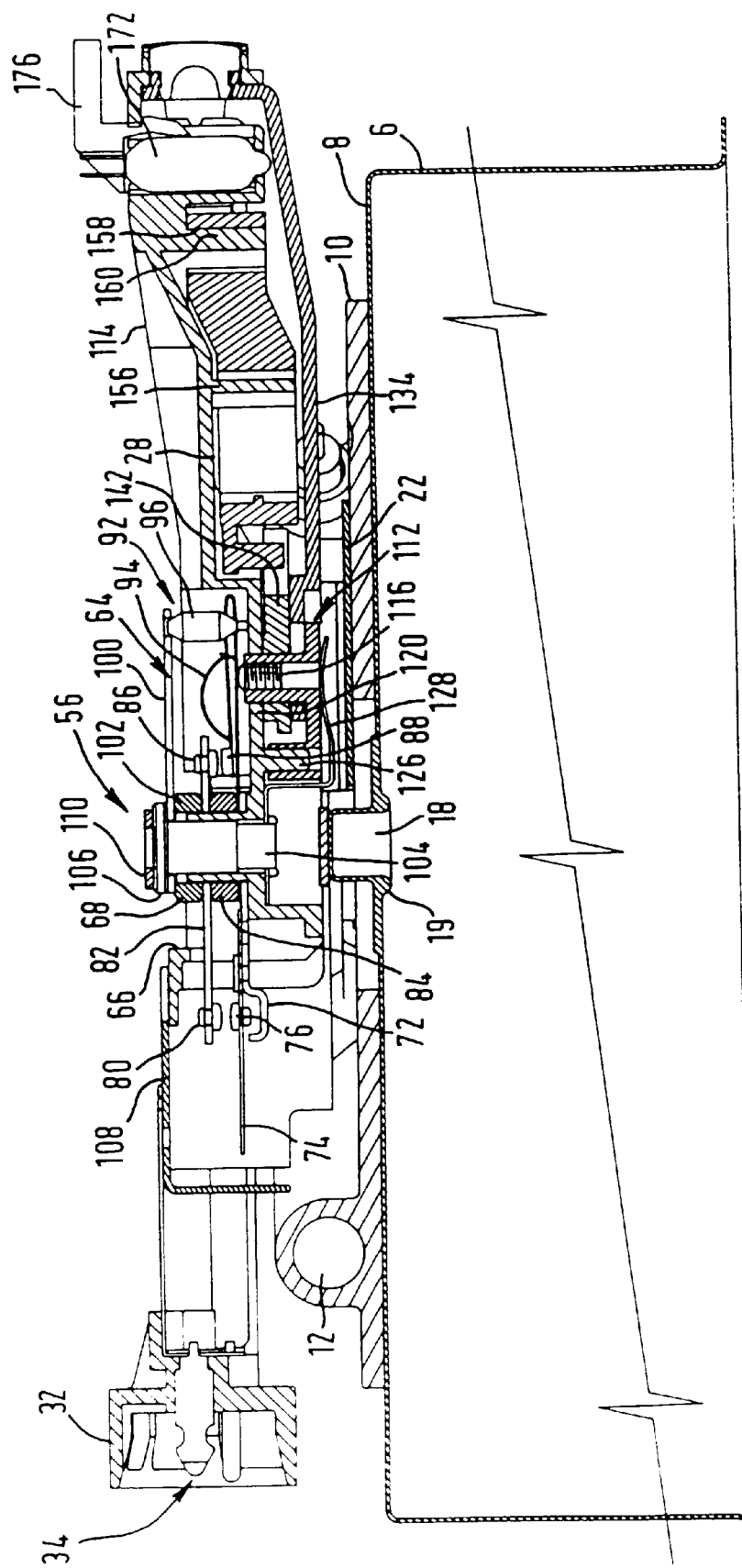
FIG. 4 shows a vertical sectional view along the line IV—IV of FIG. 3.
Figure 5:
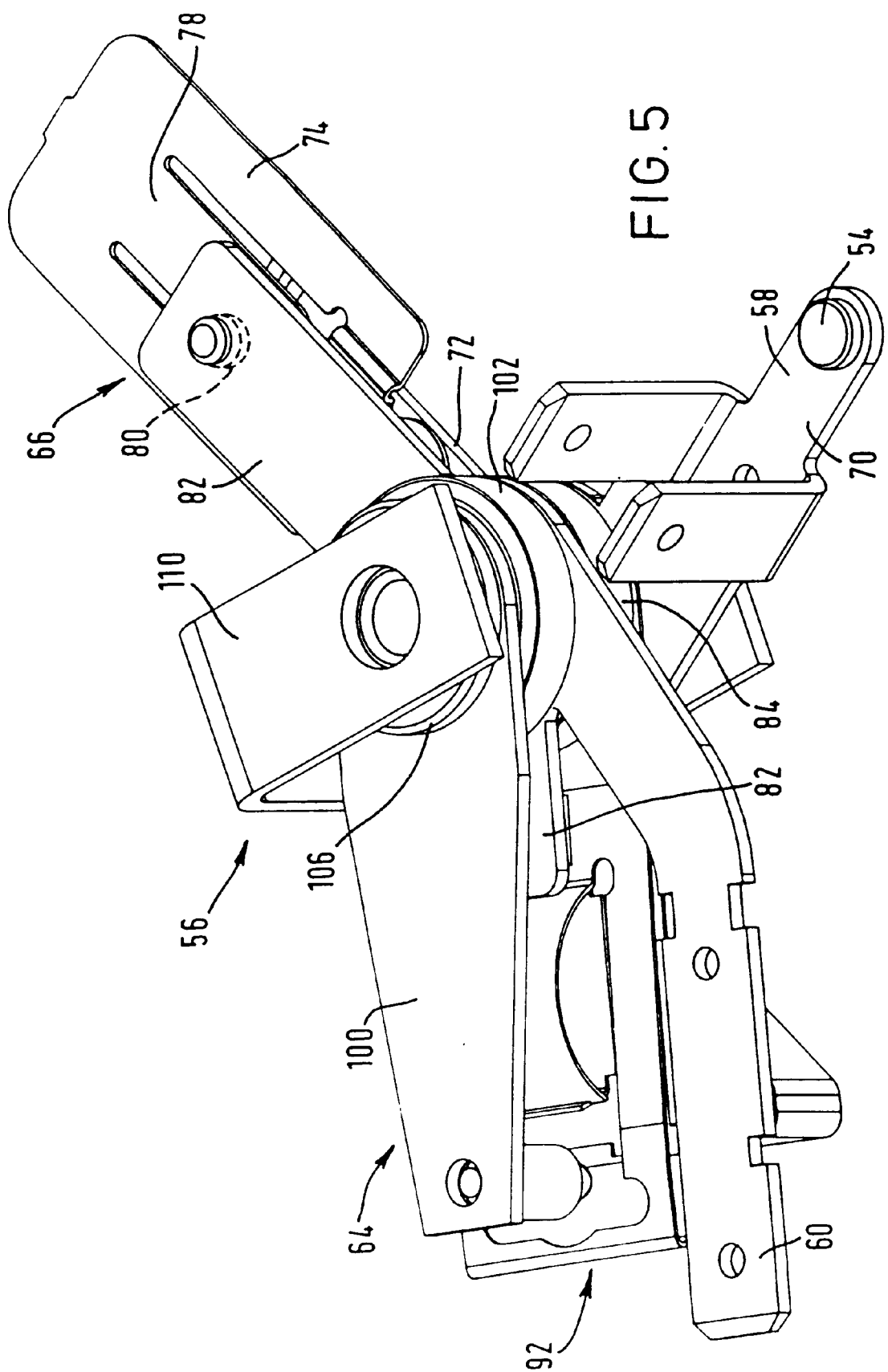
FIG. 5 shows the switch components of the embodiment in further detail.

As can be seen most clearly in FIG. 4, the base 8 of the vessel 6 is provided with a relatively small sump 18 arranged centrally of the base, with the thermal diffusion plate 10 being arranged around it. The volume of this sump 18 is relatively small compared to the volume of the vessel as a whole. The sump 18 has a lip 19 arranged to direct convected liquid away from the sump 18.

Mounted to the base 8 is an integrated control unit 20 which performs a number of different control functions for the airpot 2.

The control unit 20 comprises a mount plate 22 which is a mild steel pressing. The mount plate 22 is secured to the thermal diffusion plate 10 through a plurality of mounting holes 24. A pair of snap-acting bimetallic actuators 26 are mounted on a face of the mount plate 22 so that once the mount plate 22 is mounted to the thermal diffusing plate 10 to lie in good thermal contact with the diffusion plate. A plastics moulding 28 is mounted to the other face of the mount plate 22 by one or more lugs 30 provided on the mount plate 22 extending through corresponding apertures in the moulding and being folded over to secure the moulding in position.

The moulding 28 is generally in the shape of a shallow V and arm 32 mounting an electrical connector 34, and the other arm 114 mounting an adjustment mechanism 112 for the control as will be described further below. The connector 34 is offset from the axis of arm 33 so that when the adjustment mechanism faces forwardly for operation by a user, the connector 34 is offset so that the airpot may be pushed snugly against a wall without interference from the connector 34.

The arm 32 of the moulding is bifurcated, being provided at its distal end 32 with the electrical connector 34 for connection to a plug connector not shown. Line and neutral pins 36,38 have line and neutral conductors 40,42 riveted to their inner ends, these conductors being in the form of strips which run inside channels 44,46 formed in the moulding. An earth conductor 41 is rivetted at one end to an earth pin 37 and at its other end to a portion of the mount plate 22. The opposite ends of the conductors 40,42 are provided with respective electrical contacts 48,50 and are deflectable by push rods 52 operable by the bimetallic actuators 26 on overheating of the vessel base.

The electrical contact 48 on the neutral conductor 42 is deflected away from a fixed contact 54 provided on a further switch unit 56 which is mounted on the moulding 28 and whose outlet terminal 60 may be connected by means (not shown) to a terminal of the heating element 12. The electrical contact 50 on the other conductor 40 makes electrical contact with a fixed contact on a further terminal member 62 mounted in the moulding 28 and which is connected to the other terminal of the heating element.

The switch unit 56 comprises two electrical switches 64,66 which are arranged electrically in parallel with one another. The first switch 64 operates after a certain time delay once liquid in the vessel boils in order to interrupt the electrical supply to the element 12. The other switch unit 66 operates as a simmer control to maintain the liquid in the vessel at a predetermined temperature after the liquid has boiled.

As can be seen most clearly from FIG. 4, the moulding 28 has a spigot 68 upon which the various switch components are stacked. The components of the boiling control and simmer control extend away from the spigot 68 in generally opposite directions. The simmer control components comprise a mounting location 72 for a snap-acting bimetallic actuator 74. The mounting location 72 is formed integrally with the inlet terminal 58 of the unit whose other arm 70 mounts the switch contact 54. The bimetallic actuator 74 is of a type as described in GB-A-657434, that is it is dished and reverses its curvature upon its temperature rising to above a given temperature, and returning to its original configuration when the temperature falls below a lower predetermined temperature. In this case, these temperatures are about 90° and 82° respectively. It relatively thin (eg. 0.2 mm thick) is made from a high resistance material which means that it will heat quickly when a current passes through it. The actuator 74 comprises an electrical contact 76 mounted on a central leg 78 of the actuator 74. This contact 76 is arranged to make or break contact with a fixed electrical contact 80 mounted on a contact carrier 82 electrically insulated from the mounting location for the actuator by an insulating washer 84. The carrier plate 82 also forms a common component with the boiling control switch 64 in that it mounts a fixed contact 86 thereof. Furthermore, this carrier also is formed to provide the outlet terminal 60 of the control unit.

The boiling control switch comprises the contact 86 which is arranged to make an electrical connection with a movable contact 88 which is mounted on a movable arm 90 of a snap-acting microswitch 92. This microswitch is made from a single piece of material bent to the appropriate shape, which is mounted at one end between the mounting location for the bimetallic actuator 74 and the insulating washer 84. The movable arm of the microswitch is biased to one of two stable positions by a C-spring 94. The end of the microswitch remote from its mounting location is acted upon via a ceramic push rod 96 which locates in an opening 98 in a creep bimetal 100 which is mounted in the stack of components and insulated from the common carrier plate 82 by a further insulating washer 102.

Electrical energy is introduced into the switch unit 50 through the contact 54 through the inlet terminal 58 and from there both to the snap-acting bimetallic actuator 74 and to the microswitch 92, both of which are in electrical contact therewith. Depending on the state of the respective switch contacts 76,80;86,80, electrical energy will be conducted to the common carrier plate 82 and so to the terminal 60 which is itself connected to the element of the vessel.

The bimetallic actuator 74 is arranged so that when the control is mounted in the vessel it is arranged within a pressed enclosure 108 formed in the mount plate 22 in this way the actuator would be insensitive to the ambient temperature in the base of the other vessel.

The creep and bimetallic actuator 100 is, on the other hand, mounted in thermal contact with the base of the sump 18 though a C-shaped copper thermal conduction member 110 which, as can be seen from FIG. 4, is in thermal contact with the base of the sump 18. This conduction member 110 is attached to the rivet 104 by a screw (not shown) which engages in the top of the rivet 104. Thus the bimetallic actuator 100 will be responsive to the temperature of the liquid in the sump 18 rather than the ambient temperature and will thus be able to sense boiling in the vessel.

Figure 6:
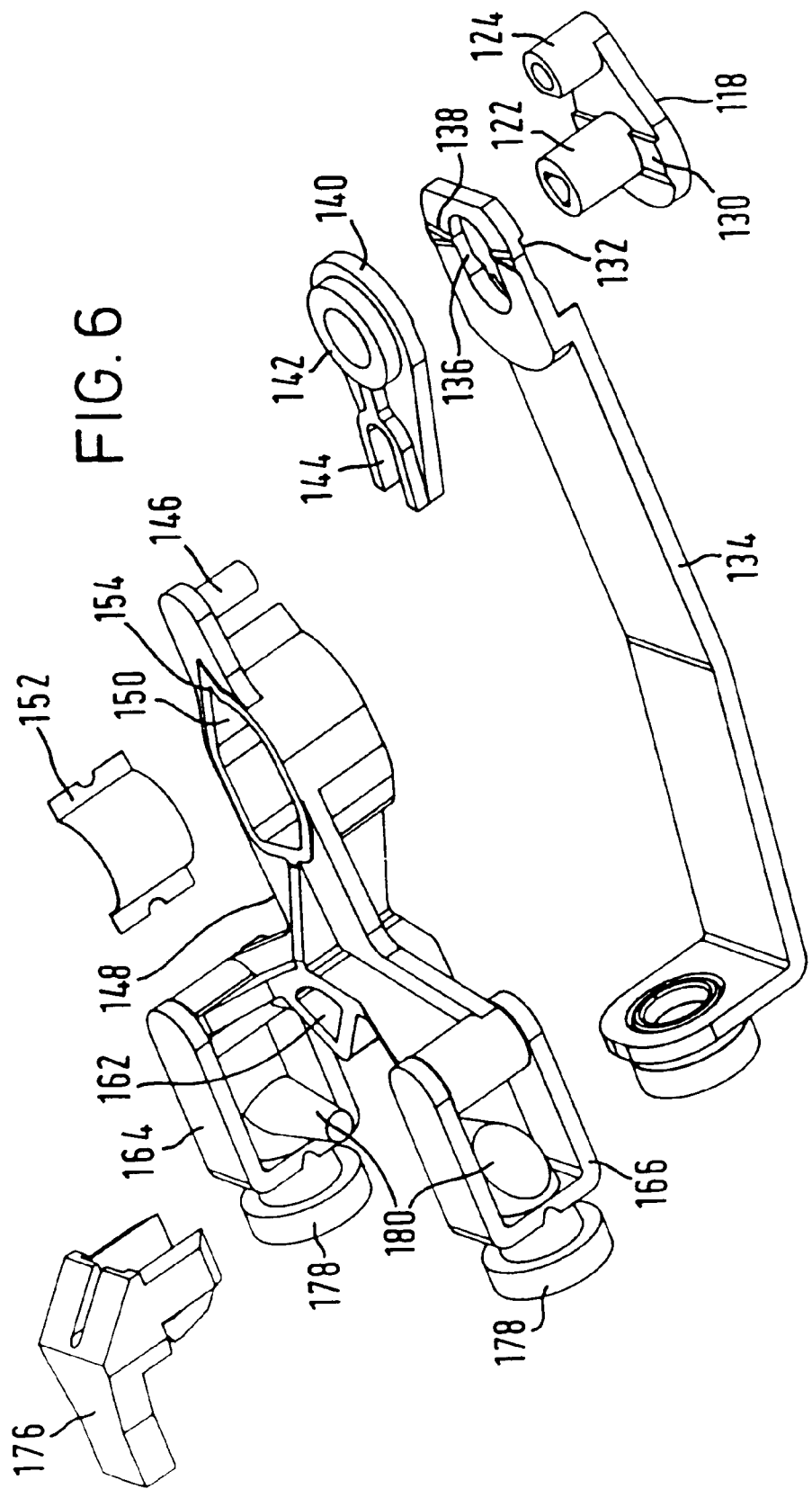
FIG. 6 shows the adjustment mechanism of the embodiment of FIGS. 1 to 5 in further detail.

The moulding 28 also provide a mounting for an adjustment mechanism 112 for the boiling control switch which will allow one of two boiling times to be chosen and which will also allow the boiling switch to be reset once it has operated. The adjustment mechanism 112 is arranged in the second arm 114 of the moulding and comprises a set screw 116 mounted in a carrier 118 which is axially slidably mounted in an aperture 120 in the moulding 28. As can be seen in FIG. 6, the carrier 118 has a spigot 122 for accommodating the set screw and has a further locating projection 124 for slidingly engaging over a locating spigot 126 on the moulding 26. The set screw 116 acts on the microswitch to change its initial ambient position so that a greater or lesser deflection (and therefore temperature rise) of the bimetallic actuator 100 is required to operate the microswitch. The carrier 118 is resiliently mounted by a spring clip 128 which is held by the rivet 104. The upper surface of the carrier 118 is provided with cam surfaces 130 which engage with cam surfaces 132 provided at one end of a reset arm 134. The spigot 122 passes through a slot in that end of the reset arm 134. The reset arm is also provided with further cam surfaces 138 which engage with cam surfaces 140 provided on a pivot member 142 through which the spigot 126 also passes.

The pivot member 142 has a slot 144 at its other end in which engages a spigot 146 formed a generally T-shaped member 148. The T-shaped member has a central aperture 150 to receive a C-spring 152 which engages with a knife edge 154 at the front of the aperture and a knife edge in a depending wall 156 of the moulding 28 (see FIG. 4). The T-shaped member is pivoted about a knife edge 158 formed in a depending pillar 160 of the moulding 28 which engages the V of an aperture 162 formed in the cross piece of the T (see FIG. 4). A pair of buttons 164,166 are pivotally mounted on the ends of the crosspiece of the T so as to extend through apertures 168 in the moulding for operation by user. The arrangement is such that as a user presses one or other of the buttons (which will represent long or short boiling time respectively), the T-shaped member 148 will pivot around the knife edge 158. Once the T-shaped member goes over centre with respect to the C-spring, the C-spring will move it with a snap-action to one limit position in which the pivot member 42 will assume a first position. By virtue of the interacting cam surfaces 130,132,136,140 on the pivot member, the reset arm 134 and the carrier will either by pushed further down against the force of the spring clip 128 or moved up under the action of the spring clip 128. This will cause the set screw 116 to change the initial position of the microswitch, thereby changing the boiling time as described above.

The reset arm 134 passes through a further aperture 170 in the moulding 28 for operation by user. This lever is biased towards the user by spring means (not shown), and is arranged such that if pressed inwardly, by virtue of the cam surfaces on 132 on its other end and the cam surfaces 130 on the carrier 118 the carrier will be moved by the set spring clip 128 in a direction to close the microswitch contacts 86,88.

As shown in FIG. 4 a neon indicator 172 may be mounted in an aperture 174 in the moulding 28. A light conductor 176 may be inserted into that opening to conduct this light to an opening in the outer vessel wall to indicator to a user that the appliance is operating. Furthermore, the buttons 164,166 may be constructed so as to have light conductive or transmissive end portions 178 which are coupled with light pipes 180. The moulding 28 may have an opening arranged on either side of the neon 172 which, when a particular 164,166 has been depressed will lie opposite that opening, thereby transmitting light to the button 178 indicating which boil time has been selected by a user. When the other button is pressed, rotation of the T-shaped member will move the other light pipe opposite to its aperture thereby transmitting light to that button to indicate that a new boil time has been selected.

The mode of operation of the embodiment will now be described. When the vessel 4 contains cold water, all the contact pairs in the control will be closed. When, therefore, the power supply to the device is turned on (for example by a wall socket switch) electrical energy will be supplied to the element 12 of the vessel, on the neutral side, through the neutral pin 36, the neutral conductor 40, the switch contacts 50 and the connector 62, and on the line side through the line connector 38, the line conductor 42, the switch contacts 48,54 and the switch unit 56.

As the liquid in the vessel heats, the temperature of liquid in the sump 18 lags behind that of the main part of the liquid since it is thermally insulated from the heating element 12 by virtue of the low thermal conductivity of the base material and since it lies substantially below the plane of the element 12 it will not receive significant heating through convection therefrom. Further there is relatively little convection or turbulence to mix it with the main body of the liquid. Typically this temperature lag may be between 8 and 10° C. However, once the liquid in the vessel 6 begins to boil, the liquid in the sump 18 is displaced to mix with the remainder of the liquid which means its temperature and thus that of the sump 18 will rise quite rapidly. This temperature is then transmitted to the switch unit 56 through the thermal conduction member 110 and into the bimetallic actuator 100. As it heats, the bimetallic actuator 100 deflects downwardly (in the sense of FIG. 4) and acts on the microswitch 92 through the push rod 96. Once the bimetallic actuator 100 deflects to a predetermined degree, (determined by the setting of the set screw 116), say corresponding to a temperature of 75° C., it will move the microswitch over-centre so that the contact pair 86, 88 will open with a snap action.

The bimetallic actuator 74 is also heated during the heating of the liquid in the vessel by a proportion of the current flowing to the element (determined effectively by the relative resistances of the actuator 74 and the microswitch 92). If when the boiling control operates the simmer contacts 86,88 are open (for example if the temperature in the enclosure 108 has not stabilised), the full heater current (say 7A) will flow through the actuator 74, so that it will heat quickly to open the contacts 76,80. Once both sets of contacts in the switching of 56 open, the power to the element 12 will be interrupted. The actuator 74 may continue to operate and thus pulse energy to the element 12 until the temperature in the enclosure stabilises. However the pulses of energy will not be sufficient to prevent the liquid from cooling.

Once the power to the element 12 is interrupted, the liquid in the vessel 6 will begin to cool. The sump 18 is, however, cooled more quickly than the rest of the vessel base by virtue of the heat conductive copper strip 110 which conducts heat away from the sump and dissipates the heat by convection. This means that the bimetallic actuator 100 also cools relatively rapidly which means that within a relatively short period it will have cooled once more to below the temperature at which it operates, so that the microswitch 92 may thereafter be reset by a user by the user pressing the reset button 169.

The automatic reset temperature of the microswitch 92 is chosen such that in normal operation it does not remake before the bimetallic actuator 74 which controls the simmering of the liquid in the vessel. In particular, as the liquid in the vessel cools, the ambient temperature in the enclosure 108 also falls and at predetermined temperature in the enclosure (for example 82° which may correspond to a liquid temperature of 92° in the vessel) the central arm 78 of the bimetallic actuator 74 will snap upwardly in the sense of FIG. 4 to close the contacts 76,80, thereby reconnecting the electrical supply to the element 12. With the contact 76,80 closed, current flows through the actuator 74 which means that it is very quickly resistively heated and when it reaches its operating temperature the arm will snap in the opposite direction to open the contacts again thereby again disconnecting the supply to the element. Since this energy burst is relatively short, and due to the relatively high thermal capacity of the element 12, in this short time heat energy will not immediately have been transmitted to the liquid in the vessel, but will be released thereafter, raising the temperature very slightly to above the desired temperature. As the actuator 74 and the enclosure cool again below the predetermined value, the switch once again remakes, repeating the process. Typically power may be supplied for a period of about four seconds and thereafter be disconnected for up to about one minute, to maintain the temperature at the is desired value. This gives a power on to power off ratio of about 7% which gives an average power supply of about 50 W, which is satisfactory. The short energy burst will be sufficient to keep the liquid at the desired temperature, without causing audible heating of the liquid in the vessel.

If it is desired to change the boiling time of the vessel then as described above one or other of the buttons 164,166 may be depressed to change the set point of the microswitch 92. Furthermore, although not shown, a dual simmer temperature may be provided by changing the set point of the actuator 74.

If it is desired to reboil the liquid in the vessel, then as mentioned above it is only necessary to press button 169 to reset the microswitch 92 (assuming that it has fallen to below its operating temperature). Furthermore, if the vessel has been turned off overnight, the liquid temperature in the vessel 6 will fall to such a degree that the microswitch 92 will automatically close thereby ensuring that when the vessel is turned on again in the morning the liquid will start to heat immediately. Furthermore, if fresh cold liquid is added to the vessel during operation, again the temperature of the liquid in the sump will fall to a value to allow the microswitch to reset automatically whereafter the liquid will automatically start to boil again.

In the event that the vessel is turned on without any water in it or should for any reason boil dry, with the switch 56 failing to operate, the temperature of the diffusion plate 10 will rise to a value such as to cause the one or other bimetallic actuator 26 to operate thereby opening the contacts 54,48,56,50 in the line or neutral supply to the element thereby disconnecting the power to the element.

Figure 7:
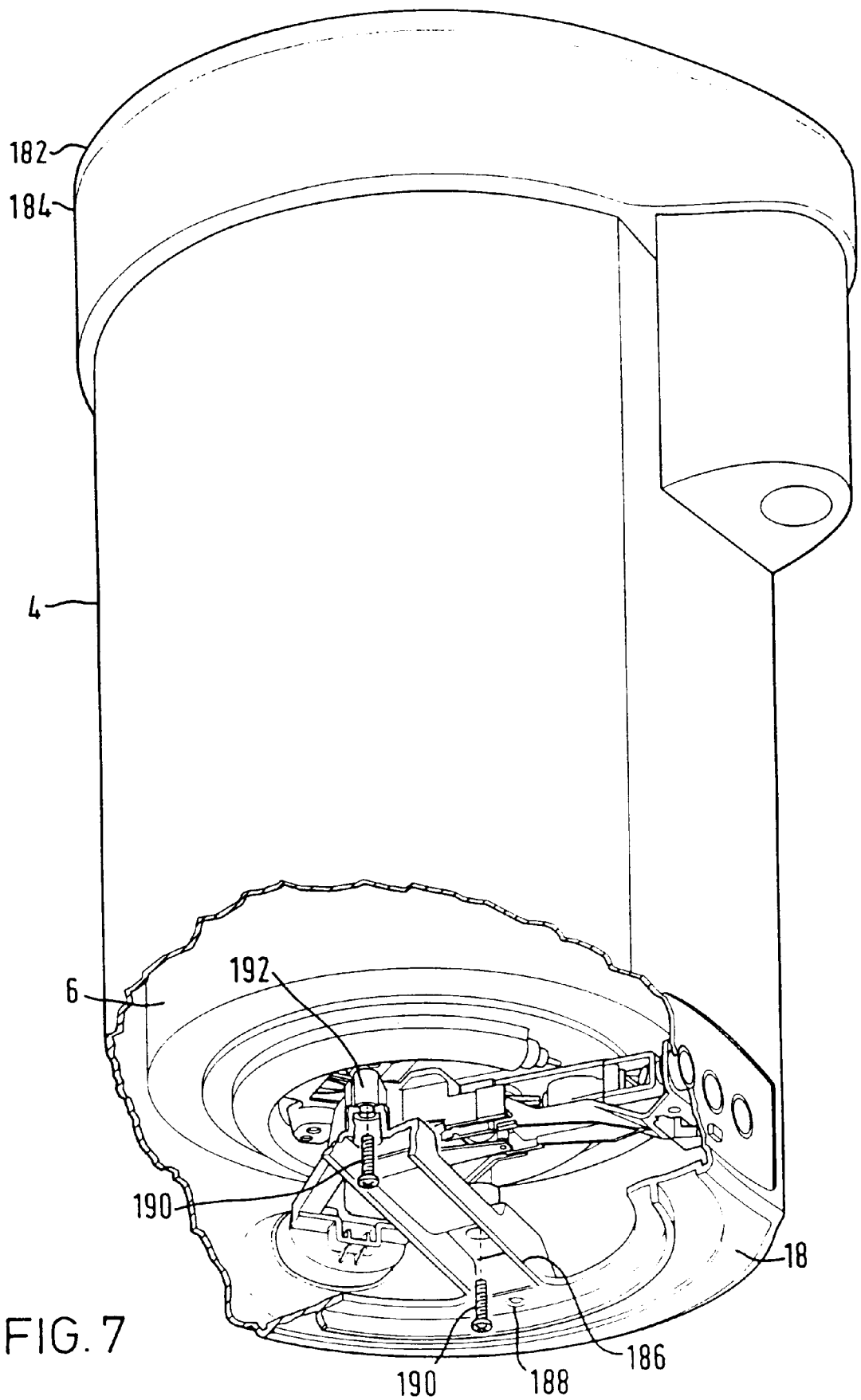
FIG. 7 shows a method of mounting the casing of a vessel of the invention.

FIG. 7 shows one way of assembling a moulded casing 4 to the inner liquid containing vessel 6 of an airpot comprises a peripheral flange 182 against which abuts, via a sealing ring (not shown), the upper edge 184 of the outer casing 4. The lower part of the casing 4 is moulded integrally with a partial base cover 186 and a cross member 188 which has two apertures 188 (FIG. 1) through which fasteners such as screws 190 may be inserted. The screws 190 pass through bores 192 in the moulding 28 into mounting holes provided in the mount plate 22. Upon tightening the screws 190, the upper edge 184 of the casing 4 will be clamped against the flange 182 of the inner vessel 6. This provides a simple method of assembling the casing 4 to the inner vessel 6.

Figure 8:
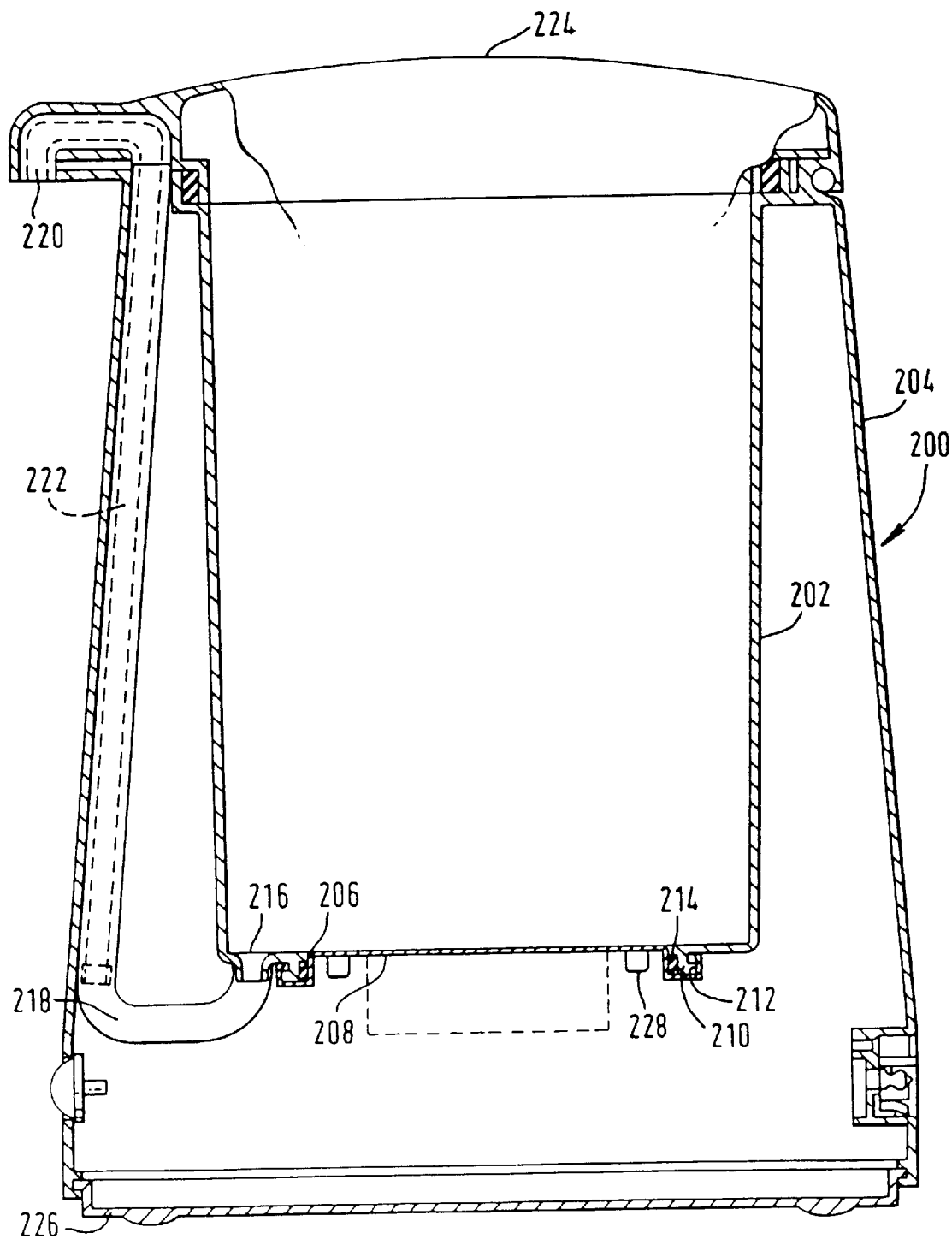
FIG. 8 shows a yet further embodiment of the invention.

With reference to FIG. 8, a further embodiment of the invention is shown schematically. An airpot 200 comprises an inner liquid containing portion 202 and an outer casing 204 arranged around the inner portion 202. These are integrally moulded as a single part.

The base of the inner portion 202 is formed with an opening 206 which is closed by a heating plate 208. This heating plate 208 is attached to a depending flange 210 on the inner vessel base by means of a peripheral channel 212 and an interposed silicone rubber seal 214. The plate 208 may be provided with a sheathed heating element 228 and control 230, for example of the type as disclosed in FIGS. 1 to 6 or with other known heating and control arrangements.

An outlet 216 is provided in the base of the inner portion 202 which is connected to a silicone rubber tube 218 leading to an outlet 220 in the upper part of the vessel via a delivery pipe 222. This pipe 222 may be integrally moulded in the casing 204, and, if the material of the casing in at least that region is transparent, may also act as a liquid level indicator.

A lid 224 is pivotally mounted on the vessel in a conventional manner so as to seal the vessel, with pump means being arranged in the lid also in a known manner.

The base of the vessel is provided with a cover plate which may be mounted on a rotary base 226.

Figure 9:
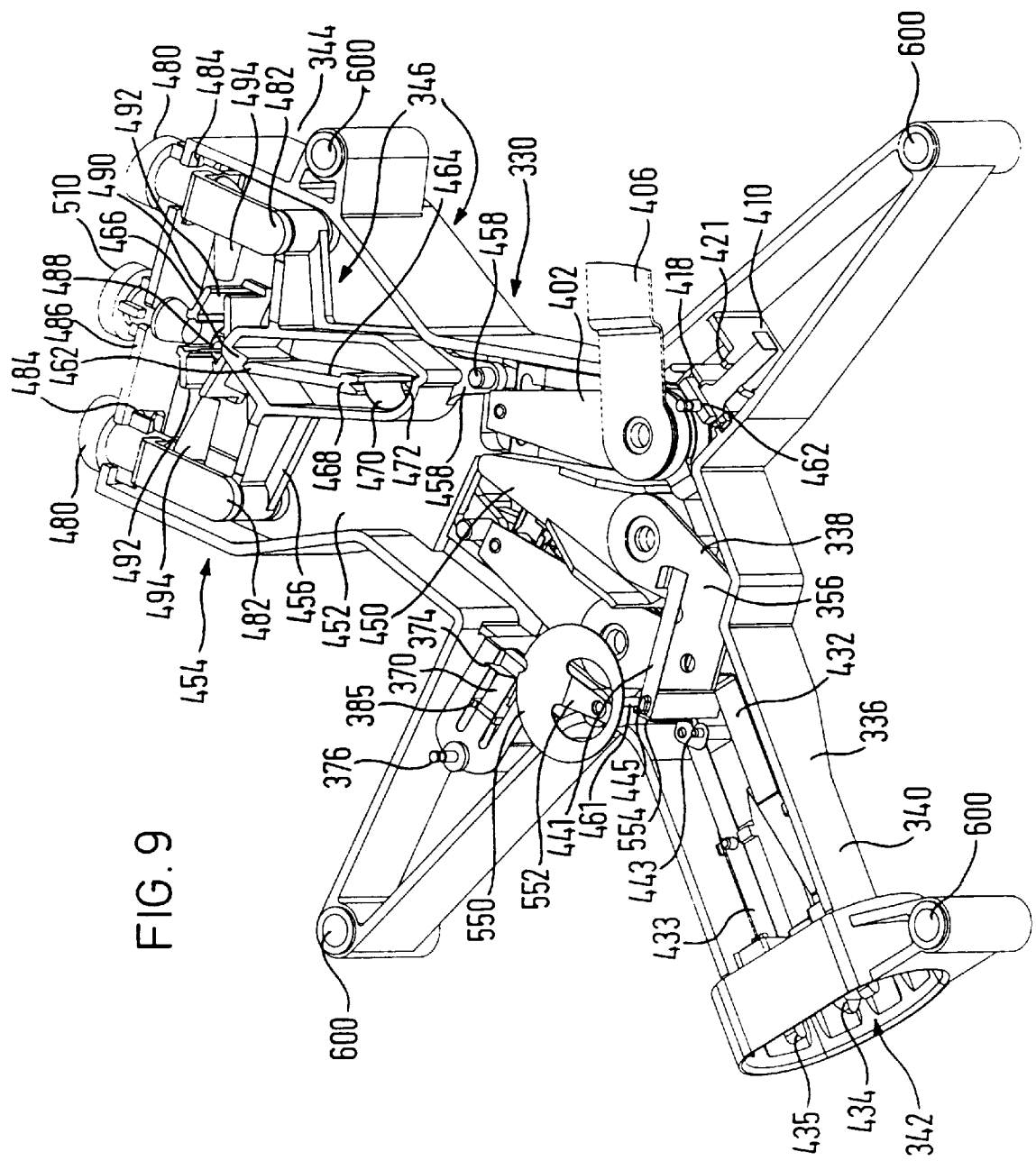
FIG. 9 shows a perspective view of a second embodiment of a control in accordance with the invention.

With reference to FIG. 9 et seq, a further embodiment of the invention is shown schematically. An airpot 300 comprises an inner liquid containing portion 302 and an outer casing 304 arranged around the inner portion 302. These are preferably integrally moulded as a single part.

As in the embodiment of FIG. 8, the base of the inner portion 302 is formed with an opening 306 which is closed by a heating plate 308. This heating plate 308 is attached to a depending flange (not shown) on the inner vessel base by means of a peripheral channel 312 (FIGS. 13 and 14) and an interposed silicone rubber seal (not shown). Such a mounting arrangement is described in greater detail in WO 96/18331. In this embodiment however, the plate 308 is provided with a thick film printed heating element 310.

Figure 17:
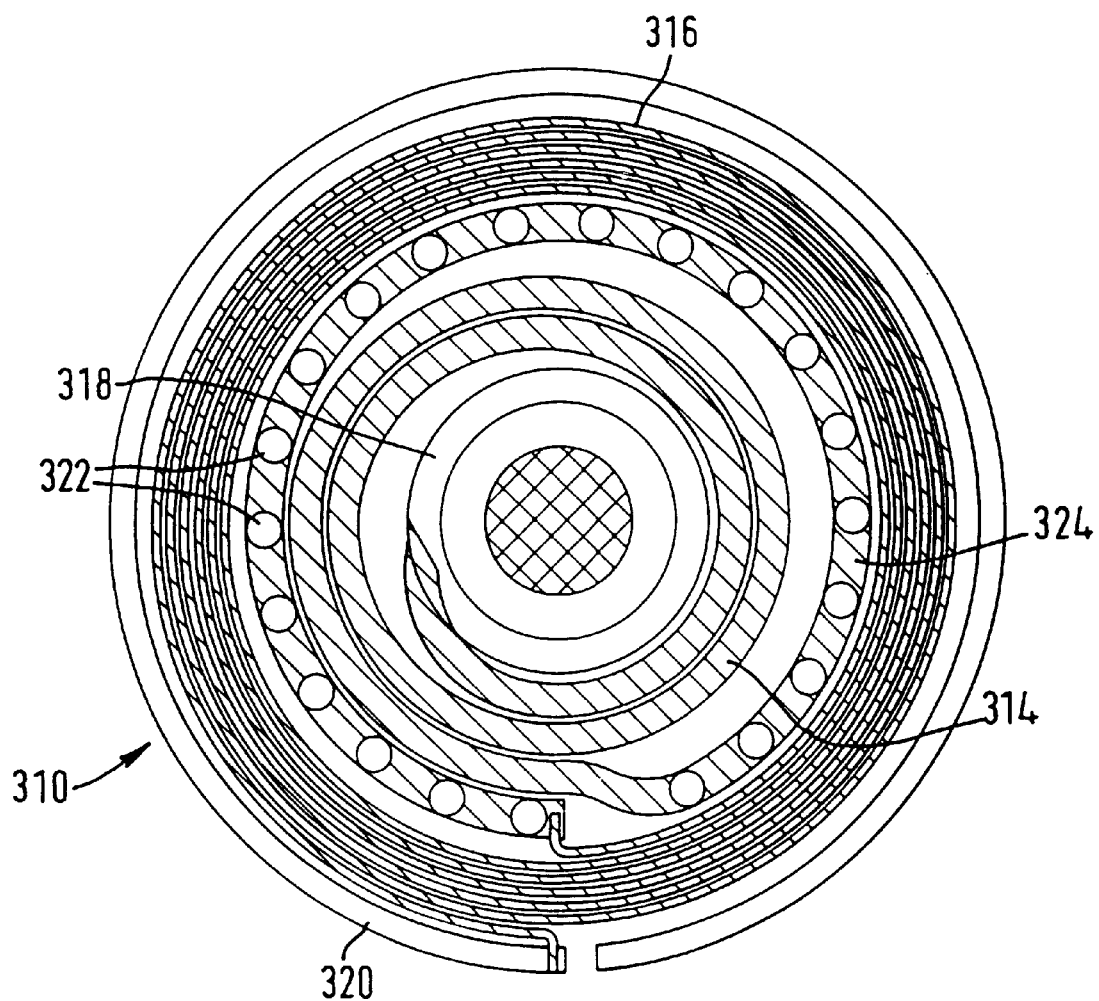
FIG. 17 shows a heater embodying the invention.

The heating element 310 is shown schematically in FIG. 17, and comprises and inner 314 and outer 316 resistive heating tracks printed or otherwise laid down on an insulating substrate. The inner section 314 acts as a main heating section, while the outer section 316 acts as a simmer section, as will be described further below. Printed inner and outer terminal rings 318,320 are connected to the inner end of the inner element section 314 and the outer end of the outer element section 316. The inner and outer track sections 314,316 are covered by an overglaze. However, the inner and outer rings 318,320 are not covered, and a number of windows 322 are provided in a generally circular intermediate portion 324 of the track to provide a plurality of contact locations thereon. Printed contacts are arranged within the windows. The simmer track portion 316 is chosen to have a resistance of about 190 $\Omega$ resulting in a wattage of about 50 W at a supply voltage of 100V and to have a watts density of about 5 $Wcm^{-2}$ so as to prevent audible heating sounds during operation. The main track portion 314 is arranged to have resistance of about 15 $\Omega$, resulting in a wattage of about 700 W with a 100V supply and a watts density of 55 $Wcm^{-2}$.

Figure 18:
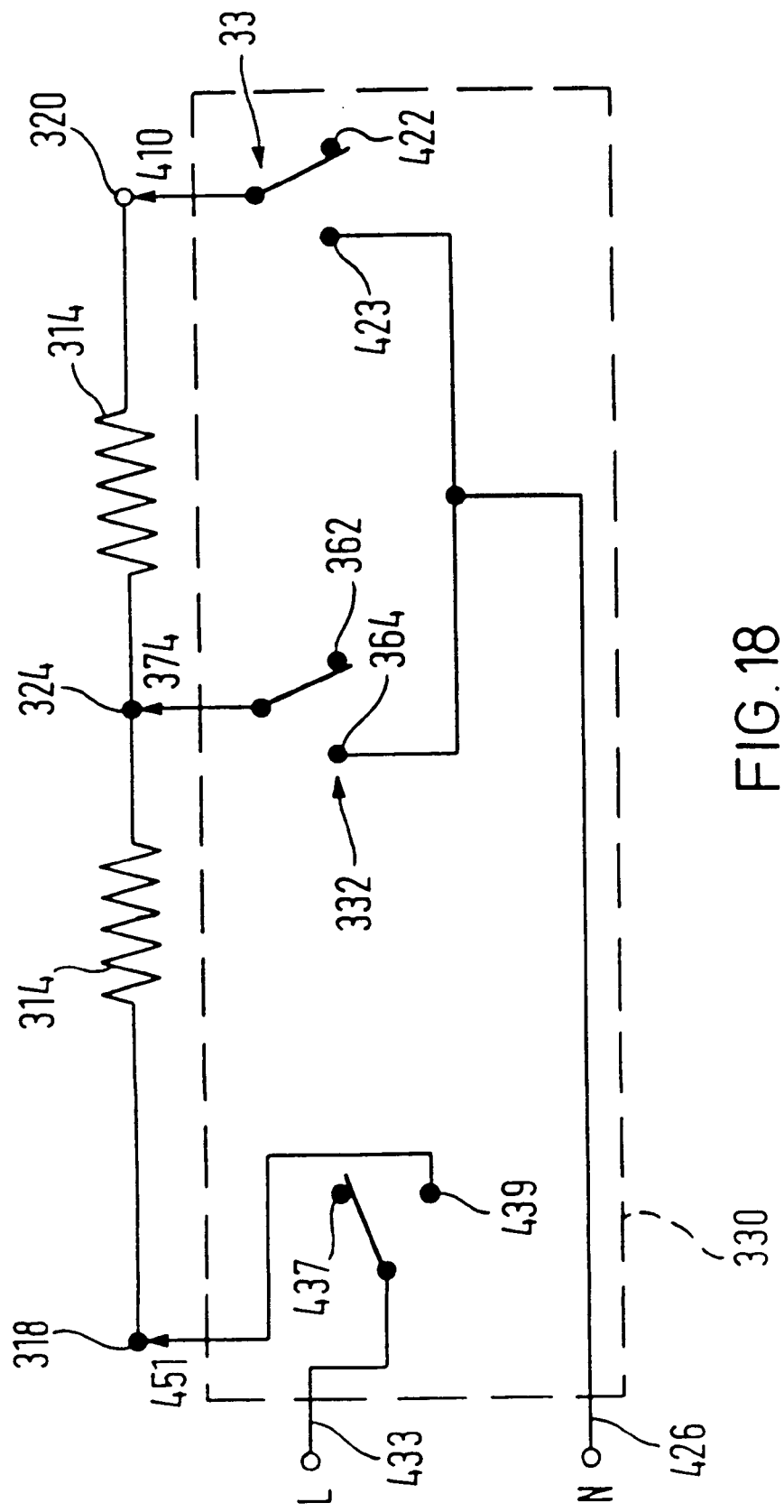
FIG. 18 shows a circuit diagram of the heater of FIGS. 9–17.

As can be seen schematically in FIG. 18, the element is controlled by an integrated control unit 330 arranged in the electrical supply to the element. As in the earlier embodiment, this control comprises a boiling control 332 and a simmer control 334.

Figure 11:
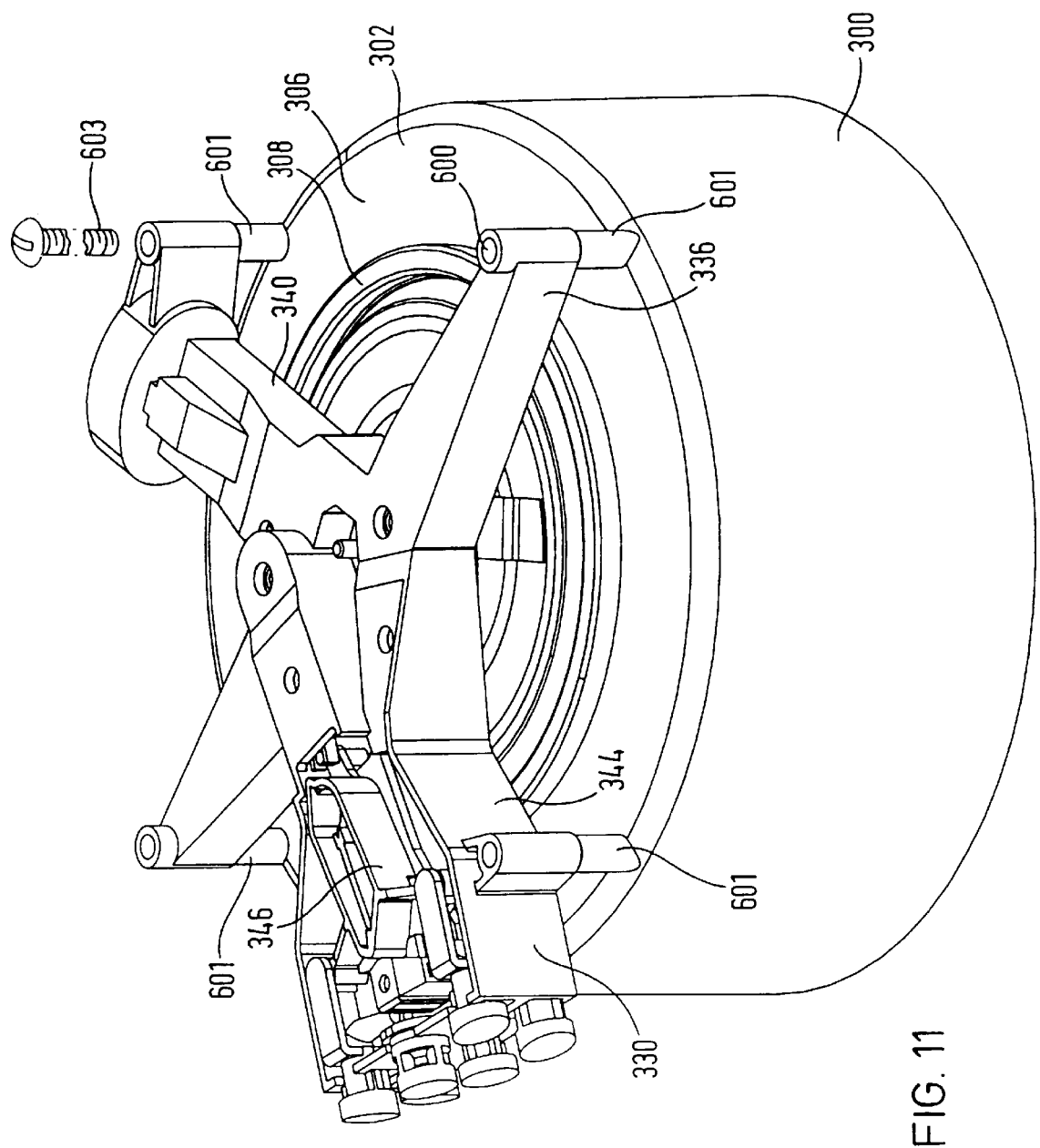
FIG. 11 shows the control of FIG. 9 with certain components omitted for clarity.

As can be seen from FIGS. 9 and 11, the control unit 330 comprises a generally cruciform plastics moulding 336 which mounts at its centre a double switch unit 338.

One arm 340 of the moulding is provided with an electrical connector 342 for the vessel while the other arm 344 mounts a double adjustment mechanism 346 for the control unit as will be described further below.

Figure 12:
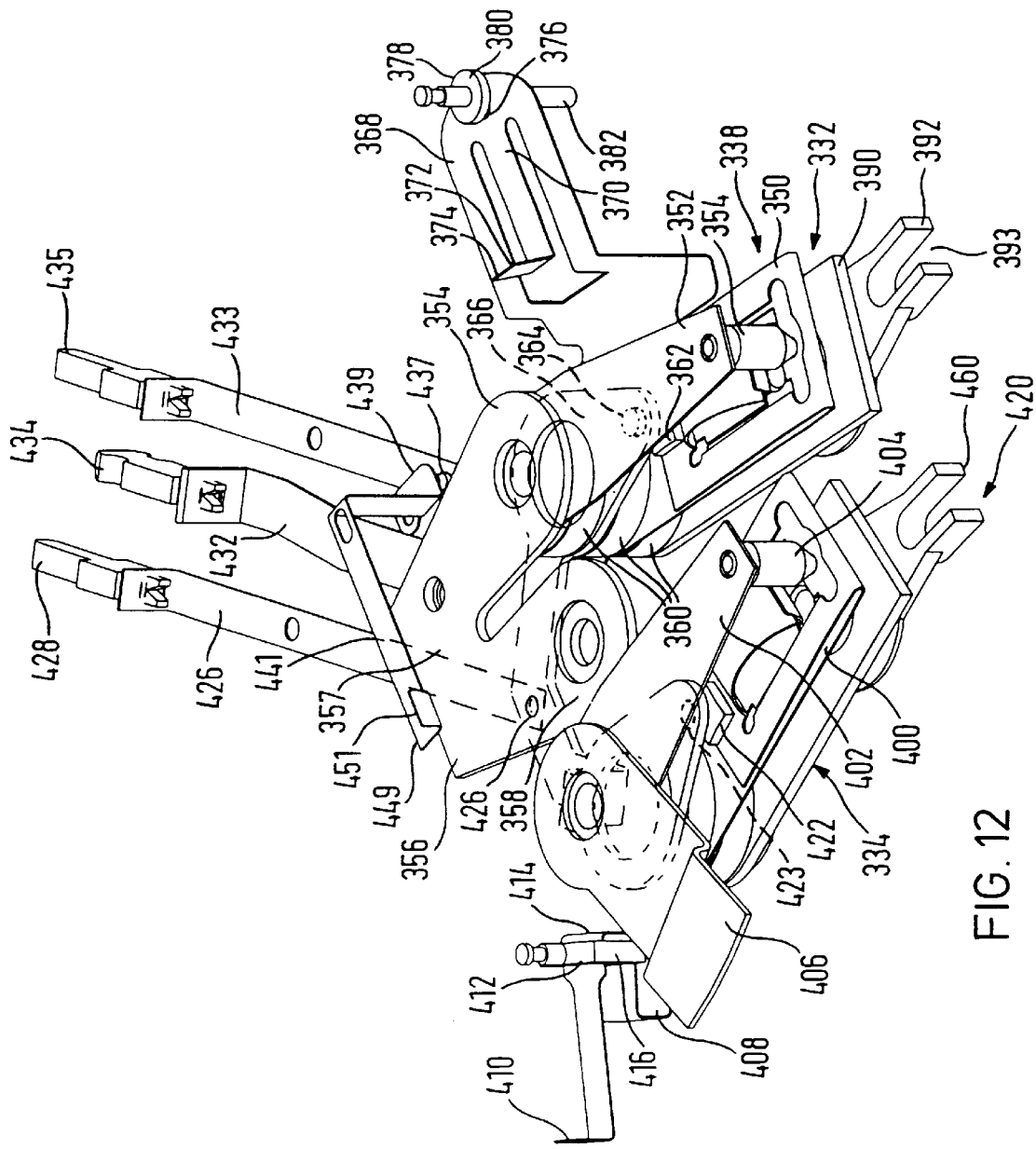
FIG. 12 shows the components of FIG. 10 in a different orientation.

Turning to the boiling and simmer controls, these are pre-assembled into a double switch unit 338, which is shown most clearly in FIG. 12.

The boiling control 332 comprises a snap-acting microswitch 350 which is acted upon by a creep bimetallic actuator 352 through a push rod 354. The actuator 352 is in close thermal contact at one end with one end 354 of a generally V-shaped copper strip 356. The other end 358 of the strip 356 is arranged, in use, in contact with the base of the vessel sump, as in the earlier embodiment. The thermal conduction of the strip can be adjusted to the appropriate value by reducing the width of the base 357 of the 'V'.

The boiling control 332 is assembled as a stack of components separated by insulating washers 360, and held together by a rivet or screw not shown. The microswitch 350 mounts a movable contact 362 which makes contact with a fixed contact 364 provided on a U-shaped plate 366. The microswitch 350 is also in electrical contact with a contact blade 368 which is mounted directly below the microswitch 350 in the stack of components. The contact blade 368 has a centrally released, resilient tongue 370 which has an upstanding end 372 whose free end forms a contact 374 for connection to the inner ring 318 of the heater track. Adjacent the base of the tongue a slot 376 mounts a thermally deformable push rod 378. The push rod 378 has a double collar 380 to retain the rod on the blade 368, and has an extension 382 received in a guide bore 384 in the moulding. This will be described further below.

The boiling control also comprises a base plate 390 which is provided with a cam surface (not shown) with a rotatable cam member (not shown) movable through a cam arm 392 mounted at the free end of the base plate 390. Upon rotation of the cam arm 392, the cam member is raised or lowered, and acts upon the microswitch so as to change the set point thereof thereby changing the amount of movement of (and thus the degree of heating of) the bimetallic actuator 352 needed to trip the microswitch 350. This is a similar arrangement to that described in the first embodiment, and allows different boiling times to be set.

The simmer control 334 is very similar to the boiling control 332 in construction, and comprises a snap-acting microswitch 400 acted upon by a creep bimetallic actuator 402 through a push rod 404. One end of the bimetallic actuator 402 is arranged in face to face thermal contact with a copper strip 406 which in use lies over and engages the simmer portion 316 of the heater track, as shown in FIG. 10.

Figure 10:
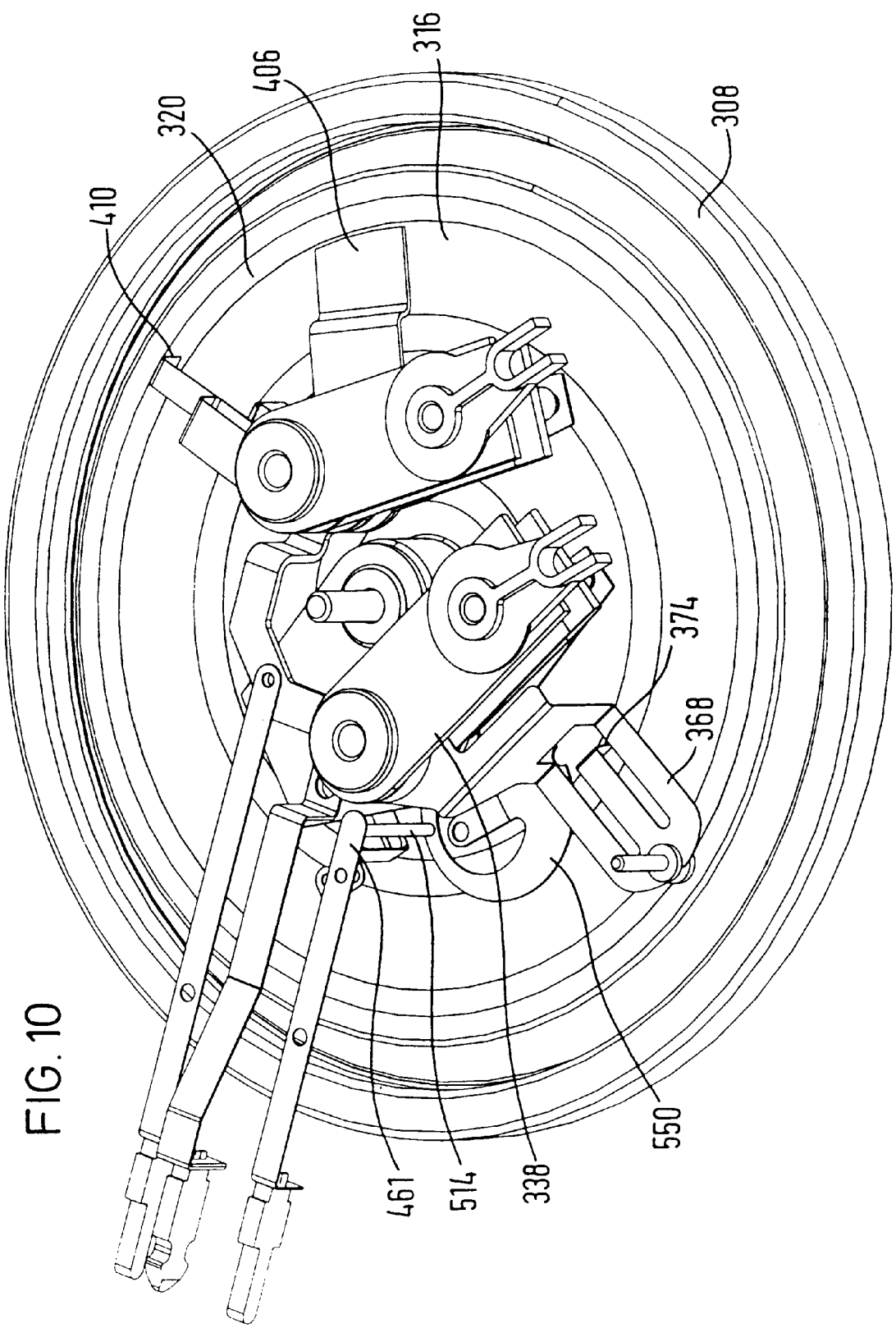
FIG. 10 shows an underneath prospective view of the control of FIG. 8 mounted to the base of a vessel.

The microswitch blade 400 is in physical and electrical contact with a serpentine contact blade 408 whose free end is turned over to form a knife edge contact 410 with the outer ring 320 of the heater track as shown in FIG. 10. A thermally deformable push rod 412 is mounted at one end 414 of the blade 308. The push rod 412 has a slot in its body 416 to allow it to be slotted over the blade. The body is received in guides 418 in the control moulding, as will be described further below.

The simmer control has an adjustment mechanism 420 essentially the same in construction to that described in relation to the boiling control 312 and which need but therefore be described further.

The microswitch has a movable contact 422 which makes and breaks electrical contact with a fixed contact 424 provided on the plate 366 which thus acts as a common "neutral" line for each control and to connect the respective contacts physically. Indeed the plate 366 is joined, for example by a rivet 426, to a neutral connector strip 428 which is, after the unit has been positioned in the moulding in turn riveted to a pin 430 of the connector 342. Finally, an earth strip 432 connected to an earth pin 434 of the connector 342 is joined, for example screwed to the conduction member 356 to provide an earth link to the sump of the vessel.

Turning now to FIG. 9, this shows the simmer/boiling control assembly mounted in the moulding 336, and ready for assembly to the base of the vessel. The assembly is received in a generally V-shaped recess in the moulding, with the boiling switch 332 being arranged below the simmer switch 334. The end 358 of the thermal conduction member 356 is arranged to rest on a platform 450 of the moulding 336. The arm 344 of the moulding 336 has an intermediate wall 452 extending across it. On one side of the wall 452 is arranged a first mechanism 454 for adjusting the simmer control. This mechanism comprises a generally T-shaped, moulded rocker arm 456 having a pin provided at one end 458 thereof which extends into the slot 460 of the cam member 420 of the simmer control. The rocker arm 456 is pivoted about a knife edge 462 provided on an upstand 464 of the moulding, which engages in a corresponding V-notch 466 in the rocker arm. The other end of the upstand 464 is provided with a V notch 468 which mounts one end of a C-spring 470 the other end of which engages in a V notch 472 in the lower part of the rocker arm. This spring acts to bias the rocker arm between two stable positions, corresponding to different simmer temperatures of the airpot.

Light transmitting buttons 480 are pivotally mounted on the outer ends 482 of the rocker arm 452 and are guided linearly in slots 484 in the end wall 486 of the moulding, such that when pressed, they will pivot the rocker arm 452 between its stable positions. As in the earlier embodiment, a neon indicator 488 is mounted in a housing 490 in the moulding, which has windows 492 arranged opposite light receiving portions 494 of the buttons, such that when aligned therewith the neon will illuminate that button, thereby indicating which button has been pressed.

Figure 15:
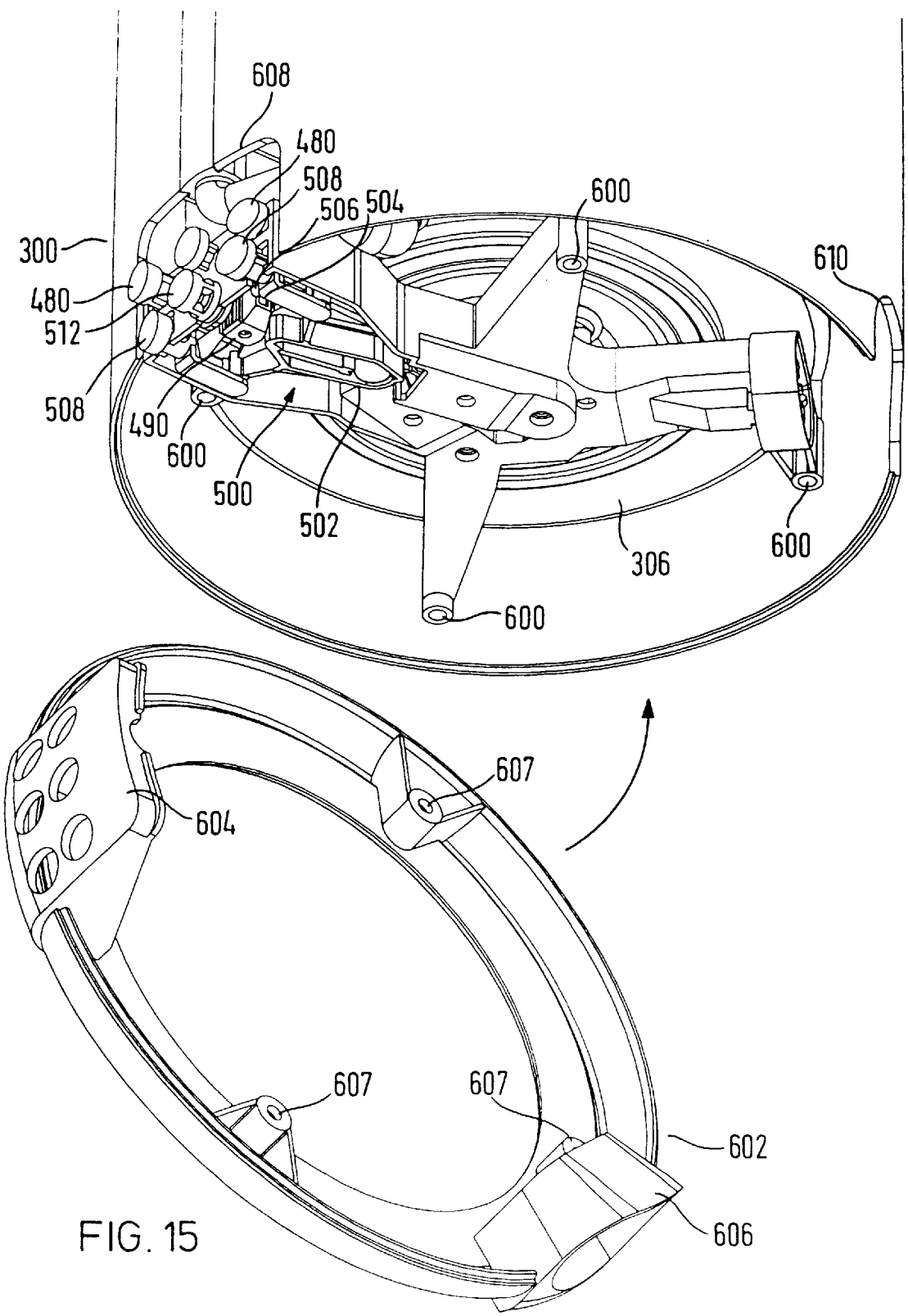
FIG. 15 shows an intermediate stage of assembly of the control to the base of the vessel.

A similar mechanism, indicated generally at 500 in FIG. 15 is provided on the other side of the intermediate wall 452 to change the setting of the boiling control. In this case, however, the rocker arm 502 engages with the slot 393 in the cam member 392 of the boiling control. The neon housing 490 extends below the intermediate wall 452 and has openings 504 arranged opposite light receiving portions 506 of buttons 508 to illuminate the operative button 508.

A light transmitting 'on' indicator button 510 is arranged opposite a further opening in the housing 492 to show the heater is energised. Furthermore, a spring loaded boiling reset button 512 is provided acting on a push rod (not shown) extending into the boiling control to move the cam member and reset the boiling mechanism, in the same general manner as described in the first embodiment.

Thus the required simmer temperature and the boiling time for the vessel can be set by pressing the appropriate buttons 480,508.

The control unit 330 is provided with three electrical connections to the heater element and three connections to an electrical supply. As described above, the neutral pin 428 of the pin connector 342 is connected to the common plate 356 by a neutral connector strip 426, and an earth connection is made between the earth pin 454 of the connector and the thermal conduction plate 356 by an earth strip 432. The line pin 435 of the connector 342 is riveted to a line connector strip 433.

This mounts a movable contact 437 on its movable free end 461 which makes contact with a fixed contact 439 provided on one end 447 of a contact strip 441 mounted in the moulding on locating spigots 443,445. The other end 449 of the contact strip 441 is turned over to form an edge contact 451 for engagement with the inner contact ring 318 of the heater track.

The contacts 437,439 may be broken under the action of a push rod 514 (FIG. 10) which engages the free end 461 of the line connector strip 433, and which is secured in a bore provided on the control moulding. The other end of the push rod 514 engages a movable portion of a snap-acting bimetallic actuator 550 of the type described in GB 1542252. This is mounted by its tongue 552 on a post 554 in the moulding, and in use is urged against the heater, so as to detect overheating thereof. If the heater does overheat, then the actuator 550 will change its curvature to push the push rod 514 so as to deflect the end 461 of the line connector strip thereby opening the contacts 437,439 thereby disconnecting the power to the heater. This therefore provides an overheat protector for the control.

The other connections to the heater track are made through the edge contacts 374,410 to the intermediate and outer contact regions of the heater track. These contacts are also designed to break in the event that the heater seriously overheats.

Figure 13A:
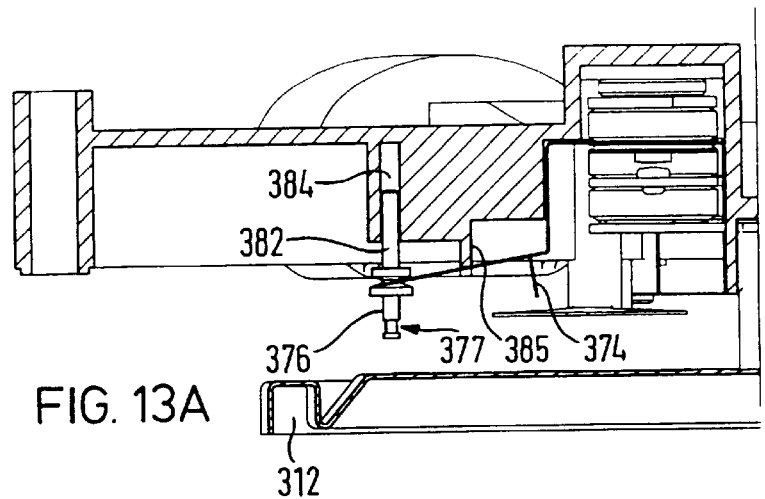
FIGS. 13a–13c show a section through a first contact of the control in different stages of operation.
Figure 13B:
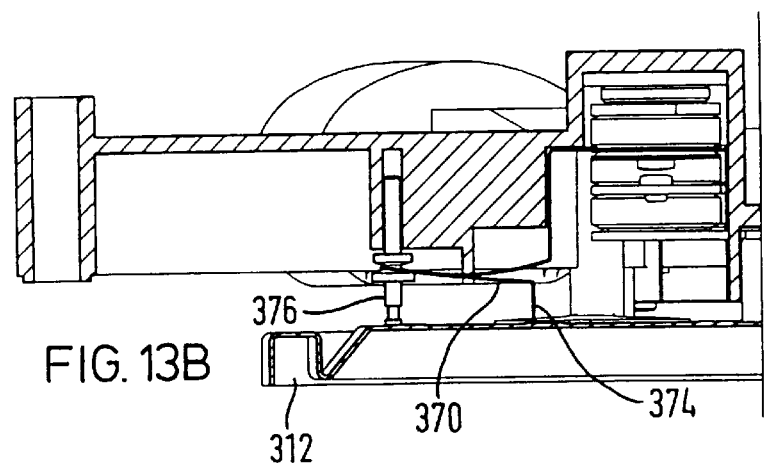
Figure 13C:
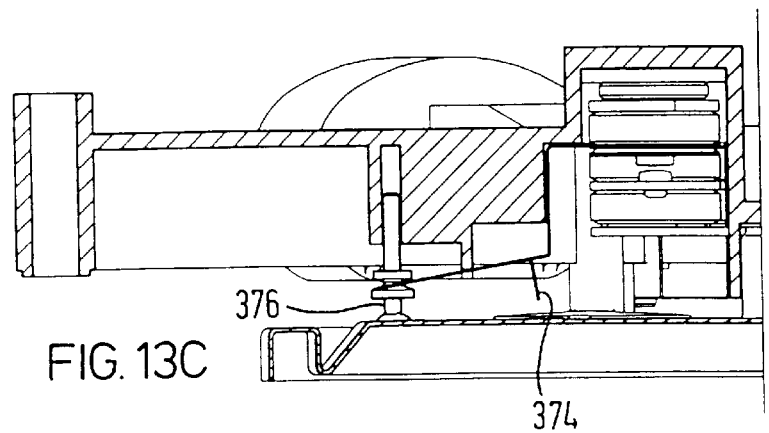

FIGS. 13A to 13C show the operation of contact 374. As stated earlier, an end of blade 368 mounts a thermally deformable push rod 376 of nylon, ryton or the like. A portion 382 of the push rod is guided in a bore 384 in the moulding 336. The moulding is provided with an upstanding wall 385 over which the tongue 370 of the blade 368 extends and which acts as a fulcrum for the tongue 370. As can be seen from FIG. 13A, in the unmounted condition, the push rod 376 extends beyond the contact 374, so that as it engages the heater, it will cause tongue 370 to pivot around the fulcrum 385 into the position shown in FIG. 13B when it is fully engaged with the heater, and the contact 374 is fully biased into engagement with the heater track. This also acts to spring load the blade 368. In the event that the heater overheats, the end of the push rod 376, which has an area 377 of reduced cross-section behind its free end, in the same manner as described in GB 2204450, will soften and deform under heat and the push rod 376 will move towards the heater by virtue of the pre-loading of the blade 368 thereby allowing the contact 374 to pivot away from the heater track, as shown in FIG. 13C. This disconnects the electrical supply to at least part of the heater track.

Figure 14A:
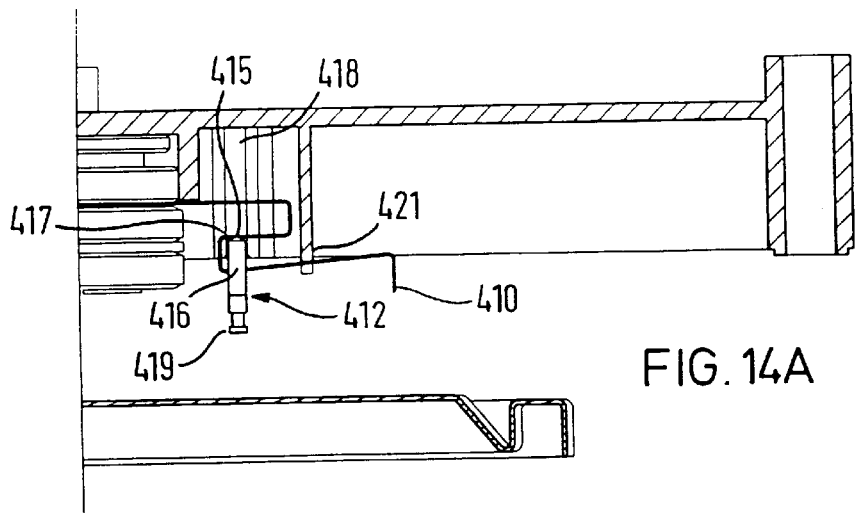
FIGS. 14a–14c show a section through a second contact of the control in different stages of operation.
Figure 14B:
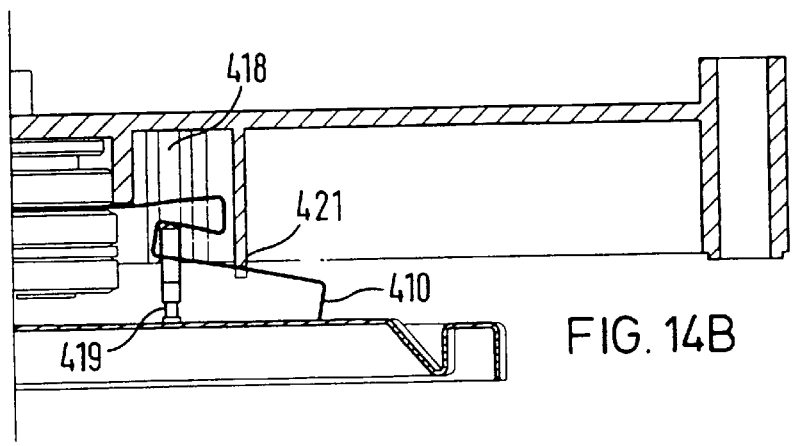
Figure 14C:
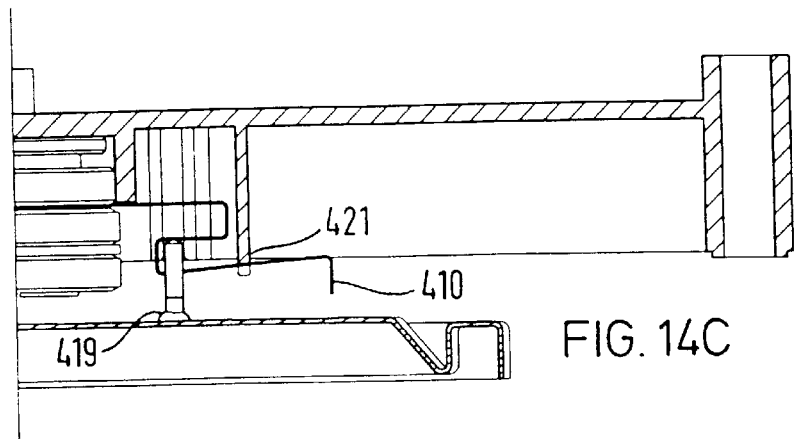

The other contact 410 is described in FIGS. 14A to 14C, and operates on a similar principle. As shown in FIG. 14A, the push rod body 416 is received in guides 413 in the moulding. Its inner end 415 engages an intermediate portion 417 of a resilient serpentine member 408, while its free end 419 extends beyond the contact 410. The moulding has an upstand 421 over which the strip extends and which acts as a fulcrum for the contact 410. Thus as the control is moved towards the heater, the end 419 of the push rod 412 will engage with the heater and will cause the strip to pivot around the fulcrum 421 and move into engagement with the heater track, as shown in FIG. 14B and it will also stress the serpentine member 408. In the event that the heater overheats, the free end 419 of the push rod will soften and move under the force of the stressed spring allowing the contact 410 to pivot away from the heater track to the position shown in FIG. 14C, thereby disconnecting the supply to at least part of the heater track.

Both these contact arrangements thus act as thermal fuses which will protect the user in the even that all other controls fail and the heater overheats. Provided both fuses operate, the power supply to the heater will be completely disconnected.

Figure 16:
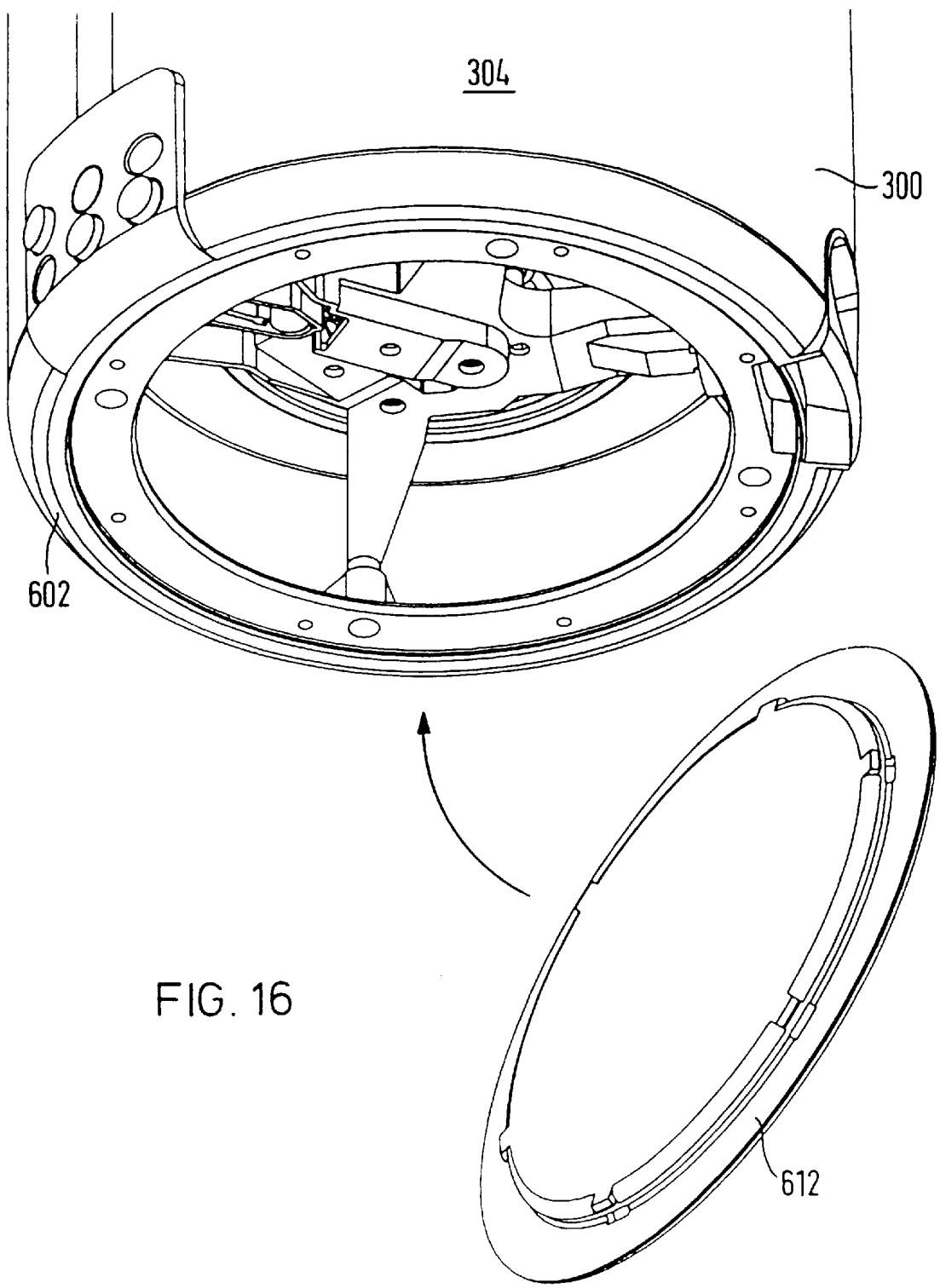
FIG. 16 shows, schematically a cover for the base.

The control unit 330 is mounted to the vessel base using four screws 603 or the like which extend through bores 600 provided on the respective limbs of the control unit moulding 336 into threaded bores 601 on the vessel base. These screws also act to mount an annular ring base 602 of the vessel (FIG. 15) in position which provides a face plate 604 for the control button array, and an inlet 606 for the electrical connector 342. The ring 602 is provided with four moulded bores 607 to receive the screws 603. These are received in complementary cut-outs 608,610 in the vessel outer moulding. Finally a base cover plate 612 (FIG. 16) may be clipped into the base ring 602 to cover the control and electrical components.

As can be seen in FIG. 19, a sight gauge 612 may be received in a slot the outer casing 304 of the airpot which may also act to direct liquid to an outlet.

Operation of the device will now be described briefly. When the vessel is switched on initially, both the "main" and "simmer" elements will be energised. This will provide initially a rather low heating effect (due to the high overall resistance of the tracks). However, as the heater track heats, the simmer control which is heated by the simmer portion 316 of the track will operate. This switch is arranged in parallel with the boiling switch (see FIG. 18), which is sensitive to the sump temperature, rather than the heater temperature. The boiling switch will remain closed, so allowing the full supply voltage to be applied across the low resistance main heating portion 314 of the track to heat the liquid in the vessel. When, as in the first embodiment, liquid in the vessel boils, the sump temperature will rise rapidly, and heat will be conducted to the boiling switch by the conduction member 356. After an empirically determined delay, the temperature of the boiling bimetallic actuator 352 will rise sufficiently to trip the boiling microswitch 350 which then disconnects the power to the heater. The characteristics of the boiling bimetallic actuator 452 and microswitch 450 are similar to that discussed in the first embodiment which will allow a resetting of the boiling microswitch 450 using the reset button 512.

As the liquid in the vessel cools, its temperature will be transferred by the simmer bimetallic actuator 402 through the thermal conductive link 406 arranged in contact with the simmer portion 316 of the heater track. When the temperature falls below a predetermined temperature, the simmer microswitch 400 will snap shut, thereby supplying power both to the simmer and main track portions 316,314.

However, in view of the large difference in resistance of these track portions, with an applied voltage of 100 V, the "main" track portion 314 will contribute only a relatively small heating effect, say 2.5 W, compared to 45 W for the simmer portion 316.

Accordingly, the simmer portion of the track will heat the liquid until its temperature, as sensed through the thermal conductor link 406 rises sufficiently to once again operate the simmer microswitch 400 thereby once again disconnecting the electrical supply to the heater.

The boil time and simmer temperature may be set by pressing the appropriate buttons on the vessel which change the set points of the respective microswitches. For example the boil control may allow for a 5 minute or 10 minute boil time, and the simmer control for a 85° or 95° C. temperature.

The above embodiment uses a 'fixed' electrical connector 342 which, in use, is engaged with a socket provided as a power cord. In an alternative embodiment, the connector 342 could be replaced by a 'cordless' connector, arranged generally centrally of the control. Suitable power connections can be made between the line and neutral terminals of the connector and the control.

What is claimed is:

1. A liquid heating vessel having a heating element and base, the base having a sump with a relatively small volume compared to the volume of the vessel as a whole, for containing a relatively small volume of liquid, thermally-responsive means arranged thermally remote from said sump, for interrupting a flow path of electrical energy to the element upon reaching a predetermined temperature, and thermal conduction means arranged between said sump and said thermally responsive means for conducting heat from the sump to the thermally responsive means.

2. A liquid heating vessel having a heating element and base, the base having a sump region having a relatively small volume compared to the volume of the vessel for containing a relatively small volume of liquid, thermally-responsive means responsive to the temperature of liquid in said sump and interrupting a flow path of electrical power to the element at a predetermined temperature, and thermal conduction means in thermal contact with said sump for conducting heat away from said sump so as to cool the sump once power to said element has been interrupted, said thermal conduction means comprising a member of copper or other high thermal conductivity material mounted against said sump.

3. A liquid heating vessel as claimed in claim 2 wherein the thermal conduction means comprises a strip of copper or other high thermal conductivity material which is arranged in thermal contact with the sump, and which is in thermal contact with the thermally responsive means at a location remote from the sump.

4. A liquid heating vessel as claimed in claim 1 wherein the thermally responsive means comprises a bimetallic actuator which acts to open a set of electrical contacts.

5. A liquid heating vessel as claimed in claim 1 wherein the thermally responsive means is configured to reset automatically once its temperature falls below a predetermined reset temperature.

6. A liquid heating vessel as claimed in claim 5 wherein the thermally responsive means is further arranged so as to be resettable manually once it cools to below its "break" temperature.

7. A liquid heating vessel as claimed in claim 1 comprising means for varying the liquid boiling time.

8. A liquid heating vessel as claimed in claim 1 comprising simmer control means operable to maintain the liquid in the vessel at a predetermined temperature after boiling.

9. A liquid heating vessel as claimed in claim 8 wherein a single element is controlled by both said boiling control and said simmer control.

10. A liquid heating vessel having a heating element and base, the base having a region for isolating a relatively small volume of liquid compared to the volume of the vessel, and boiling control means for interrupting the supply of electrical energy to the element in the event of liquid in the vessel boiling, said boiling control means comprising thermal conduction means arranged between said region of said base and a thermally responsive means remote therefrom.

11. A liquid heating vessel having a heating element and base, the base having a region for isolating a relatively small volume compared to the volume of the vessel, and thermal conduction means in thermal contact with said region for conducting heat away therefrom so as to cool the region more rapidly than surrounding regions once heating of the liquid in the vessel ceases.

* * * * *